United States Patent
Varnoosfaderani et al.

(10) Patent No.: US 11,283,165 B2
(45) Date of Patent: Mar. 22, 2022

(54) ANTENNA ARRAYS HAVING SHARED RADIATING ELEMENTS THAT EXHIBIT REDUCED AZIMUTH BEAMWIDTH AND INCREASED ISOLATION

(71) Applicant: CommScope Technologies LLC, Hickory, NC (US)

(72) Inventors: Mohammad Vatankhah Varnoosfaderani, Sydney (AU); Peter J. Bisiules, LaGrange Park, IL (US); Zhonghao Hu, Westmead (AU); Ozgur Isik, Westworth Point (AU); Mostafa Shabani, Chatswood (AU)

(73) Assignee: CommScope Technologies Inc., Hickory, NC (US)

( * ) Notice: Subject to any disclaimer, the term of this patent is extended or adjusted under 35 U.S.C. 154(b) by 0 days.

(21) Appl. No.: 17/116,748

(22) Filed: Dec. 9, 2020

(65) Prior Publication Data

US 2021/0098870 A1    Apr. 1, 2021

Related U.S. Application Data

(63) Continuation of application No. 16/287,114, filed on Feb. 27, 2019, now Pat. No. 10,879,605.
(Continued)

(51) Int. Cl.
*H01Q 1/52*    (2006.01)
*H01Q 21/06*   (2006.01)
(Continued)

(52) U.S. Cl.
CPC .............. *H01Q 1/523* (2013.01); *H01Q 1/246* (2013.01); *H01Q 21/0006* (2013.01);
(Continued)

(58) Field of Classification Search
CPC ........ H01Q 1/523; H01Q 21/08; H01Q 21/24; H01Q 21/0006; H01Q 21/062;
(Continued)

(56) References Cited

U.S. PATENT DOCUMENTS 6,943,732 B2   9/2005   Goettl et al.
7,050,005 B2   5/2006   Goettl
(Continued)

FOREIGN PATENT DOCUMENTS

CN   101507047 A   8/2009
CN   103178356 A   6/2013
(Continued)

OTHER PUBLICATIONS

"Chinese Office Action corresponding to Chinese Patent Application No. 201980016673.7 (Foreign Text, 16 Pages, English Translation Thereof, 10 Pages) (dated Aug. 24, 2021)".
(Continued)

*Primary Examiner* — Renan Luque
(74) *Attorney, Agent, or Firm* — Myers Bigel, P.A.

(57) ABSTRACT

Antenna arrays may include a first plurality of radiating elements responsive to respective pairs of first radio frequency signals and a second plurality of radiating elements responsive to respective pairs of second radio frequency signals. A shared radiating element is also provided, which is responsive to a corresponding pair of first radio frequency signals and a corresponding pair of second radio frequency signals. This shared radiating element may be equivalent in configuration to the first and second pluralities of radiating elements, or may have a unique configuration relative to the first and second pluralities of radiating elements. The first plurality of radiating elements and the second plurality of radiating elements can be aligned as respective first and second spaced-apart and collinear columns of radiating
(Continued)

elements, with the shared radiating element disposed about equidistant between the first and second columns.

19 Claims, 28 Drawing Sheets

Related U.S. Application Data

(60) Provisional application No. 62/768,211, filed on Nov. 16, 2018, provisional application No. 62/638,446, filed on Mar. 5, 2018.

(51) Int. Cl.
| | |
|---|---|
| *H01Q 1/24* | (2006.01) |
| *H01Q 21/22* | (2006.01) |
| *H01Q 21/00* | (2006.01) |
| *H01Q 21/24* | (2006.01) |
| *H04W 16/28* | (2009.01) |
| *H01Q 21/26* | (2006.01) |
| *H01Q 21/08* | (2006.01) |
| *H04W 88/08* | (2009.01) |

(52) U.S. Cl.
CPC ....... *H01Q 21/0025* (2013.01); *H01Q 21/062* (2013.01); *H01Q 21/08* (2013.01); *H01Q 21/22* (2013.01); *H01Q 21/24* (2013.01); *H01Q 21/26* (2013.01); *H04W 16/28* (2013.01); *H04W 88/08* (2013.01)

(58) Field of Classification Search
CPC .... H01Q 1/246; H01Q 21/22; H01Q 21/0025; H01Q 21/26; H04W 16/28; H04W 88/08
See application file for complete search history.

(56) References Cited

U.S. PATENT DOCUMENTS

| | | | |
|---|---|---|---|
| 8,416,142 | B2 | 4/2013 | Goettl |
| 9,438,278 | B2 | 9/2016 | Barker et al. |
| 9,444,151 | B2 | 9/2016 | Kurk et al. |
| 2004/0051677 | A1 | 3/2004 | Goettl |
| 2009/0179814 | A1 | 7/2009 | Park et al. |
| 2009/0278759 | A1 | 11/2009 | Moon et al. |
| 2011/0148730 | A1 | 6/2011 | Maximilian |
| 2012/0068907 | A1 | 3/2012 | Petersson et al. |
| 2013/0271336 | A1 | 10/2013 | Fauquert et al. |
| 2014/0225792 | A1 | 8/2014 | Lee et al. |
| 2015/0222015 | A1 | 8/2015 | Thalakotuna et al. |
| 2015/0222025 | A1* | 8/2015 | Song ................ H01Q 5/42 343/798 |
| 2015/0263435 | A1* | 9/2015 | Song ................ H01Q 21/26 343/810 |
| 2017/0358857 | A1* | 12/2017 | Watkins ............ H01Q 3/26 |
| 2019/0273315 | A1 | 9/2019 | Hu et al. |

FOREIGN PATENT DOCUMENTS

| | | |
|---|---|---|
| CN | 103716064 A | 4/2014 |
| CN | 105849976 A | 8/2016 |
| CN | 106576280 A | 4/2017 |
| CN | 106711622 A | 5/2017 |
| EP | 3419104 A1 | 12/2018 |
| JP | 2004241972 A | 8/2004 |
| WO | 2015082000 A1 | 6/2015 |

OTHER PUBLICATIONS

Chinese Office Action corresponding to Chinese Patent Application No. 201810242591.1 (Foreign Text, 10 Pages, English Translation Thereof, 11 Pages) (dated May 26, 2021).

Chinese Office Action corresponding to Chinese Patent Application No. 201810242591.1 (Foreign Text, 8 Pages, English Translation Thereof, 8 Pages) (dated Nov. 4, 2020).

* cited by examiner

ANTENNA ARRAYS HAVING SHARED RADIATING ELEMENTS THAT EXHIBIT REDUCED AZIMUTH BEAMWIDTH AND INCREASED ISOLATION

CROSS-REFERENCE TO RELATED APPLICATIONS

This application is a continuation of, and claims priority under 35 U.S.C. § 120 to, U.S. patent application Ser. No. 16/287,114, filed Feb. 27, 2019, which in turn claims priority under 35 U.S.C. § 119 to U.S. Provisional Application Ser. No. 62/768,211, filed Nov. 16, 2018 and to U.S. Provisional Application Ser. No. 62/638,446, filed Mar. 5, 2018. The disclosure of each of the above applications is incorporated herein by reference.

FIELD

The present invention relates to radio communications and, more particularly, to base station antenna arrays for cellular communications and methods of operating same.

BACKGROUND

Phased array antennas can create and electronically steer a beam of radio waves in varying directions without physical movement of the radiating elements therein. As shown by FIG. 1A, in a phased array antenna 10, radio frequency ("RF") feed current is provided from a transmitter ("TX") to a plurality of spaced-apart antenna radiating elements via phase shifters ("$\Phi_1$-$\Phi_8$"), which establish a desired phase relationship between the radio waves emitted by the spaced-apart radiating elements. As will be understood by those skilled in the art, a properly established phase relationship enables the radio waves emitted from the radiating elements to combine to thereby increase radiation in a desired direction (shown as θ), yet suppress radiation in an undesired direction(s). The phase shifters $\Phi_n$ are typically controlled by a computer control system ("CONTROL"), which can alter the phases of the emitted radio waves and thereby electronically steer the combined waves in varying directions. This electronic steering can be important when the phased array antennas are used in cellular communication and other RF-based systems. In most cases, the phase shifters are used to apply an electronic downtilt to the antenna beam in the vertical or "elevation" plane. In some cases, phase shifters may be used for adjusting the beam width or beam pointing direction in the horizontal or "azimuth" plane or for electronically steering antenna beams to point at individual users.

For example, in a typical cellular communications system, a geographic area is often divided into a series of regions that are commonly referred to as "cells", which are served by respective base stations. Each base station may include one or more base station antennas that are configured to provide two-way RF communications with mobile subscribers that are within the cell served by the base station. In many cases, each base station is divided into "sectors." In perhaps the most common configuration, a hexagonally shaped cell is divided into three 120° sectors, and each sector is served by one or more base station antennas, which can have an azimuth Half Power Beam Width (HPBW) of approximately 65° per sector. Typically, the base station antennas are mounted on a tower or other raised structure and the radiation patterns (a/k/a "antenna beams") are directed outwardly therefrom. Base station antennas are often implemented as linear or planar phased arrays of radiating elements. For example, as shown by FIG. 1B, a base station antenna 10' may include side-by-side columns of radiating elements ($RE_{11}$-$RE_{18}$, $RE_{21}$-$RE_{28}$), which define a pair of relatively closely spaced array antennas A1 and A2. In this base station antenna 10', each column of radiating elements may be responsive to respective phase-shifted feed signals, which are derived from corresponding RF feed signals (FEED1, FEED2) and transmitters (TX1, TX2) and varied in response to computer control (CONTROL1, CONTROL2).

In order to accommodate the ever-increasing volumes of cellular communications, cellular operators have added cellular services in a variety of new frequency bands. While in some cases it is possible to use arrays of so-called "wide-band" or "ultra wide-band" radiating elements to provide service in multiple frequency bands, in other cases it is necessary to use different arrays of radiating elements to support service in the different frequency bands.

As the number of frequency bands has proliferated, and as increased sectorization has become more common (e.g., dividing a cell into six, nine or even twelve sectors), the number of base station antennas deployed at a typical base station has increased significantly. However, due to local zoning ordinances and/or weight and wind loading constraints for the antenna towers, etc., there is often a limit as to the number of base station antennas that can be deployed at a given base station. In order to increase capacity without further increasing the number of base station antennas, so-called multi-band base station antennas have been introduced in which multiple arrays of radiating elements are included in a single antenna. One very common multi-band base station antenna design includes one linear array of "low-band" radiating elements that are used to provide service in some or all of the 694-960 MHz frequency band and two linear arrays of "high-band" radiating elements that are used to provide service in some or all of the 1695-2690 MHz frequency band. These linear arrays of low-band and high-band radiating elements are typically mounted in side-by-side fashion.

There is also significant interest in base station antennas that include two linear arrays of low-band radiating elements and two (or four) linear arrays of high-band radiating elements. For example, as shown by FIG. 1C, an antenna 12 may include two outside columns 14a, 14b of relatively low-band radiating elements (shown as five "large" radiating elements ("X") per column) and two inner columns 16a, 16b of relatively high-band radiating elements (shown as nine "small" radiating elements ("x") per column). Antennas having the configuration shown in FIG. 1C may be used in a variety of applications including 4×4 multi-input-multi-output ("MIMO") applications or as multi-band antennas having two different low-bands (e.g., a 700 MHz low-band linear array and an 800 MHz low-band linear array) and two different high-bands (e.g., an 1800 MHz high-band linear array and a 2100 MHz high-band linear array). These antennas, however, are challenging to implement in a commercially acceptable manner because achieving a 65° azimuth HPBW antenna beam in the low-band typically requires low-band radiating elements that are at least 200 mm wide. But, when two arrays of low-band radiating elements are placed side-by-side with high-band linear arrays therebetween, as shown by FIG. 1C, a base station antenna having a width of about 500 mm may be required. Such large antennas may have very high wind loading, may be very heavy, and/or may be expensive to manufacture. Operators would prefer base station antennas having widths of about 430 mm or less, which is a typical width for state-of-the-art base station antennas.

To achieve antennas having the configuration of FIG. 1C that have narrower widths, the dimensions of the low-band radiating elements may be reduced and/or the lateral spacing between the linear arrays of low-band and high-band radiating elements may be reduced. Unfortunately, as the linear arrays of radiating elements are aligned closer together, the degree of signal coupling between the linear arrays can increase significantly and this "parasitic" coupling can lead to an undesired increase in HPBW. Similarly, any reduction in the dimensions of the low-band radiating elements will often cause an increase in HPBW.

One attempt at using multiple columns of dual-polarized radiating elements to improve HPBW antenna characteristics is disclosed in U.S. Pat. No. 8,416,142 to Göttl, entitled "Dual-Polarized Group Antenna." In particular, as shown by FIG. 1D, a conventional antenna 12' can have two columns 14a and 14b of dual-polarized radiating elements that are driven to radiate along respective pairs of polarization planes (P1, P2) and (P3, P4). This conventional antenna can be modified as shown by the antenna of FIG. 1E, which is a reproduction of FIG. 9 from Göttl. In FIG. 1E, feed networks N1-N2 and N3-N4, which are responsive to respective RF input signals RF1-RF2 and RF3-RF4, can be utilized to drive left and right columns of radiating elements (RE) along polarization planes (P1, P2) and (P3, P4), respectively, and to drive a pair of "top" and "bottom" radiating elements along polarization planes (P3, P2) and (P1, P4), respectively, as shown. Notwithstanding this modification, there continues to be a need for improved antenna designs that can increase HPBW with more efficient utilization of radiating elements.

SUMMARY

Antenna arrays according to some embodiments of the invention may include a first plurality of radiating elements responsive to respective pairs of first radio frequency (RF) signals, which may be derived (e.g., via phase shifters) from a first RF feed signal(s), and a second plurality of radiating elements responsive to respective pairs of second RF signals, which may be derived (e.g., via phase shifters) from a second RF feed signal(s). A shared radiating element is also provided, which is responsive to a corresponding pair of first RF signals and a corresponding pair of second RF signals. This shared radiating element may be equivalent in configuration to the first and second pluralities of radiating elements, or may have a unique configuration relative to the first and second pluralities of radiating elements.

According to some of these embodiments of the invention, the first plurality of radiating elements and the second plurality of radiating elements can be generally aligned in a first direction as respective first and second spaced-apart columns of radiating elements, with the shared radiating element disposed intermediate the first and second columns of radiating elements, as measured in a second direction orthogonal to the first direction. In particular, the first plurality of radiating elements and the second plurality of radiating elements can be aligned in the first direction as respective first and second spaced-apart columns of radiating elements, with the shared radiating element disposed about equidistant between the first and second columns of radiating elements, as measured in the second direction. In addition, the first plurality of radiating elements may be aligned to be collinear and the second plurality of radiating elements may be aligned to be collinear.

According to further aspects of these embodiments of the invention, a first power combiner is provided, which is responsive to a first one of the first RF signals and a first one of the second RF signals, and a second power combiner is provided, which is responsive to a second one of the first RF signals and a second one of the second RF signals. These first and second power combiners also have first and second outputs, respectively, which are electrically coupled to the shared radiating element. The first and second power combiners may be selected, for example, from a group consisting of Wilkinson power dividers, T-junction power dividers, 3 dB couplers and asymmetric power dividing couplers.

According to still further embodiments of the invention, the shared radiating element is a loop radiator configured to support slant polarization. The first and second power combiners may also be configured as hybrid couplers, such as branch-line couplers, directional couplers or rat race couplers, for example. A second shared radiating element may also be provided, which is responsive to a corresponding pair of first RF signals and a corresponding pair of second RF signals. This second shared radiating element may also be disposed intermediate the first and second columns of radiating elements, as measured in the second direction. For example, the first and second shared radiating elements may be disposed adjacent opposite ends of the first and second columns of radiating elements, as measured in the first direction.

According to still further embodiments of the invention, an antenna array is provided with a first column of radiating elements responsive to respective pairs of phase-shifted first RF signals, which are derived from a first pair of RF feed signals, and a second column of radiating elements responsive to respective pairs of phase-shifted second RF signals, which are derived from a second pair of RF feed signals. A shared radiating element is provided, which is responsive to a corresponding pair of phase-shifted first RF signals and a corresponding pair of phase-shifted second RF signals, disposed intermediate said first and second columns of radiating elements. A first power combiner may also be provided, which has first and second inputs responsive to a first one of the phase-shifted first RF signals and a first one of the phase-shifted second RF signals, respectively, and an output electrically coupled to a first terminal of the shared radiating element. A second power combiner may be provided, which has first and second inputs responsive to a second one of the phase-shifted first RF signals and a second one of the phase-shifted second RF signals, respectively, and an output electrically coupled to a second terminal of the shared radiating element. Each of the first and second power combiners may be selected from a group consisting of Wilkinson power dividers, T-junction power dividers, 3 dB couplers and asymmetric power dividing couplers. The first and second power combiners may also be configured as hybrid couplers, such as branch-line couplers, directional couplers and rat race couplers.

Pursuant to still further embodiments of the present invention, base station antennas are provided that include a first array that is configured to transmit first polarization RF signals that are passed to the first array via a first feed network and to transmit second polarization RF signals that are passed to the first array via a second feed network and a second array that is configured to transmit first polarization RF signals that are passed to the second array via a third feed network and to transmit second polarization RF signals that are passed to the second array via a fourth feed network. These antenna further include a shared radiating element that is coupled to the first through fourth feed networks so that the shared radiating element is part of the first array and is part of the second array. A first vertical axis extends through the center of a first radiating element of the first array, a second vertical axis extends through the center of a first radiating element of the second array and a third vertical axis extends through the center of the shared radiating element when the base station antenna is mounted for use. The third vertical axis is between the first vertical axis and the second vertical axis.

In some embodiments, the base station antenna may further include a first power coupler having a first input that is coupled to the first feed network, a second input that is coupled to the second feed network, and an output that is coupled to a first radiator of the shared radiating element. The first power coupler may also include a first isolation path that is coupled to a first auxiliary radiating element. The first power coupler may also include a second isolation path that is coupled to a second auxiliary radiating element.

The base station may also include a second power coupler having a first input that is coupled to the first feed network, a second input that is coupled to the second feed network, and an output that is coupled to a second radiator of the shared radiating element. The second power coupler may include a first isolation path that is coupled to a third auxiliary radiating element and a second isolation path that is coupled to a fourth auxiliary radiating element.

In some embodiments, the first radiator and the first auxiliary radiating element may be configured to transmit RF energy at different polarizations. Likewise, in some embodiments, the first auxiliary radiating element and the second auxiliary radiating element may be configured to transmit RF energy at different polarizations.

In some embodiments, the shared radiating element may be positioned either above or below the radiating elements of the first array and the radiating elements of the second array when the base station antenna is mounted for use.

In some embodiments, the shared radiating element may include a first radiator that is coupled to both the first feed network and the third feed network, and a second radiator that is coupled to both the second feed network and the fourth feed network.

In some embodiments, the shared radiating element may include a first radiator that is coupled to the first feed network, a second radiator that is coupled to the second feed network, a third radiator that is coupled to the third feed network, and a fourth radiator that is coupled to the fourth feed network.

Pursuant to still further embodiments of the present invention, base station antennas are provided that include a first array that is configured to transmit first polarization RF signals that are passed to the first array via a first feed network and to transmit second polarization RF signals that are passed to the first array via a second feed network and a second array that is configured to transmit first polarization RF signals that are passed to the second array via a third feed network and to transmit second polarization RF signals that are passed to the second array via a fourth feed network. These antennas further include a shared radiating element that includes first through fourth inputs that is coupled to the first through fourth feed networks so that the shared radiating element is part of the first array and is part of the second array.

In some embodiments, a first vertical axis may extend through the center of a first radiating element of the first array, a second vertical axis may extend through the center of a first radiating element of the second array and a third vertical axis may extend through the center of the shared radiating element when the base station antenna is mounted for use, and the third vertical axis may be between the first vertical axis and the second vertical axis.

In some embodiments, a first hybrid coupler may be coupled between the first feed network and the first and second inputs of the shared radiating element, and a second hybrid coupler may be coupled between the second feed network and the third and fourth inputs of the shared radiating element. The first hybrid coupler may comprise, for example, a rat race coupler.

In some embodiments, the shared radiating element may comprise a first shared radiating element and the base station antenna may further include a second shared radiating element having a first radiator that is coupled to both the first feed network and to the second feed network so that the second shared radiating element is part of the first array and is part of the second array. In such embodiments, the first shared radiating element may be configured to generate an antenna beam having an uptilt in the elevation plane and the second shared radiating element may be configured to generate an antenna beam having a downtilt in the elevation plane.

In some embodiments, the first shared radiating element and the second shared radiating element may have the same configuration of radiators, and a first radiator of the first shared radiating element may be fed out of-phase with respect to a corresponding first radiator of the second shared radiating element.

In some embodiments, the shared radiating element may include a first radiator that is coupled to the first feed network, a second radiator that is coupled to the second feed network, a third radiator that is coupled to the third feed network, and a fourth radiator that is coupled to the fourth feed network.

Pursuant to yet additional embodiments of the present invention, power couplers are provided that include a first input port, a second input port, an output port, a first coupling transmission line that couples the first input port to the output port, a second coupling transmission line that couples the second input port to the output port, and a first isolation path that is coupled between the first coupling transmission line and a first radiating element.

In some embodiments, these power couplers may further include a second isolation path that is coupled between the second coupling transmission line and a second radiating element. The first radiating element may comprise a dipole radiator that is configured to emit RF energy having a vertical polarization.

Pursuant to still further embodiments of the present invention, base station antennas are provided that include a first array that is configured to transmit first polarization RF signals that are passed to the first array via a first feed network and to transmit second polarization RF signals that are passed to the first array via a second feed network and a shared radiating element having a first radiator that is coupled to both the first feed network and to the second feed network and a second radiator that is coupled to both the first feed network and the second feed network.

In some embodiments, the first and second radiators may be configured so that together they emit RF signals at the first polarization. The first and second radiators may also be configured so that together they also emit RF signals at the second polarization.

In some embodiments, the base station antennas may further include a second array that is configured to transmit first polarization RF signals that are passed to the second array via a third feed network and to transmit second polarization RF signals that are passed to the second array via a fourth feed network. In such embodiments, the shared radiating element may further include a third radiator that is coupled to both the third feed network and to the fourth feed network and a fourth radiator that is coupled to both the third feed network and the fourth feed network. In some embodiments, the third and fourth radiators may be configured so that together they emit RF signals at the first polarization. In some embodiments, the third and fourth radiators may be configured so that together they also emit RF signals at the second polarization.

DETAILED DESCRIPTION

Figure 2A:
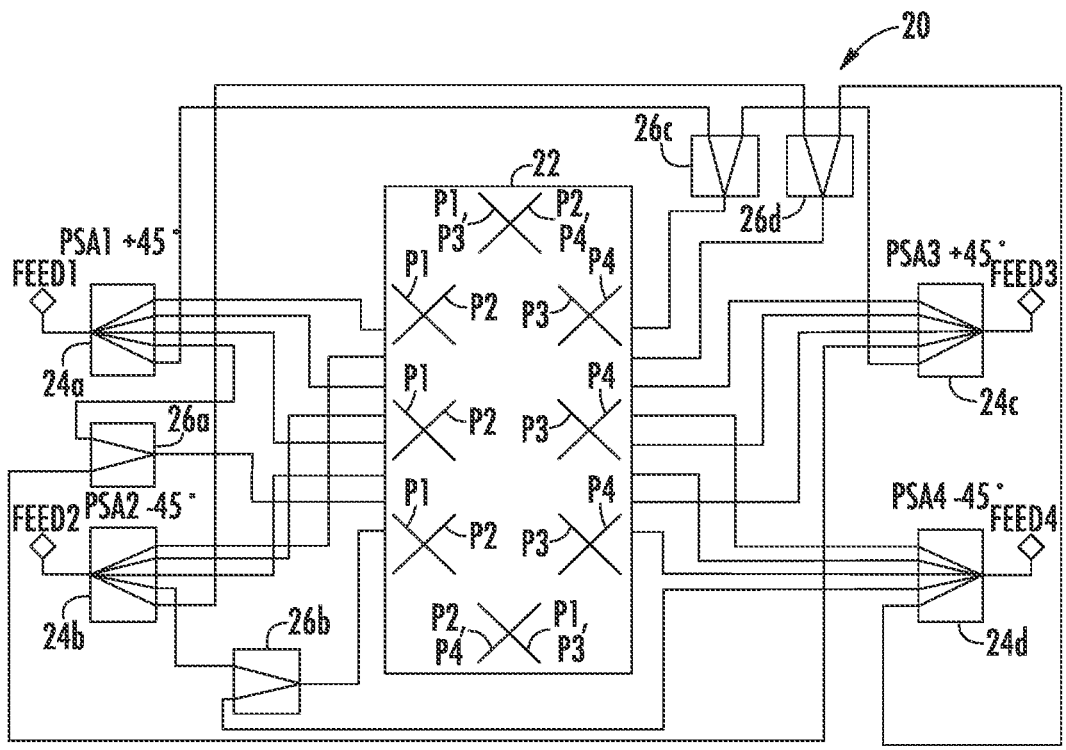
FIG. 2A is a block diagram of a base station antenna having a pair of shared HPBW-enhancing dual-polarized radiating elements therein, according to an embodiment of the present invention.

Referring now to FIG. 2A, a base station antenna 20 according to an embodiment of the invention is illustrated that includes an antenna assembly 22. The antenna assembly 2 includes six (6) dual-polarized radiating elements that are driven to radiate along respective pairs of mutually perpendicular (+45°, −45°) polarization planes (P1, P2) and (P3, P4) in respective left and right columns, as shown. In the left column and array, the three aligned radiating elements are driven in a conventional manner by a pair of a phase-shifter assemblies (PSA1, PSA2) 24a-24b, which are responsive to a corresponding pair of radio frequency feed signals (FEED1, FEED2). Similarly, in the right column and array, the three aligned radiating elements are driven by a pair of a phase-shifter assemblies (PSA3. PSA4) 24c-24d, which are responsive to a corresponding pair of radio frequency feed signals (FEED3, FEED4).

In addition, a pair of "shared" radiating elements of equivalent design are provided in the center of the antenna assembly 22 to thereby advantageously maintain relative isolation between the left and right columns of radiating elements (even when the column-to-column spacing is reduced) and support reductions in HPBW with increased azimuth directivity. As shown, the shared and centrally located radiating elements at the top and bottom of the antenna assembly 22 are driven by the phase-shifter assemblies 24a-24d and corresponding power combiners 26a-26d to radiate at somewhat reduced power levels along two pairs of polarization planes (P1, P3; P2, P4), to thereby advantageously maintain relative isolation between the left and right columns and support reductions in HPBW.

Although not wishing to be bound by any theory, as each shared radiating element is moved to the center of the antenna assembly 22, it increases the horizontal aperture of each column and simultaneously improves isolation between the columns and between the orthogonal polarizations of each column. Moreover, the number of shared radiating elements aligned to the center of the antenna assembly 22 can be increased to tune the HPBW concurrently with tuning the roll off characteristics of the arrays by adjusting array-to-array spacing in the assembly 22.

Figure 2B:
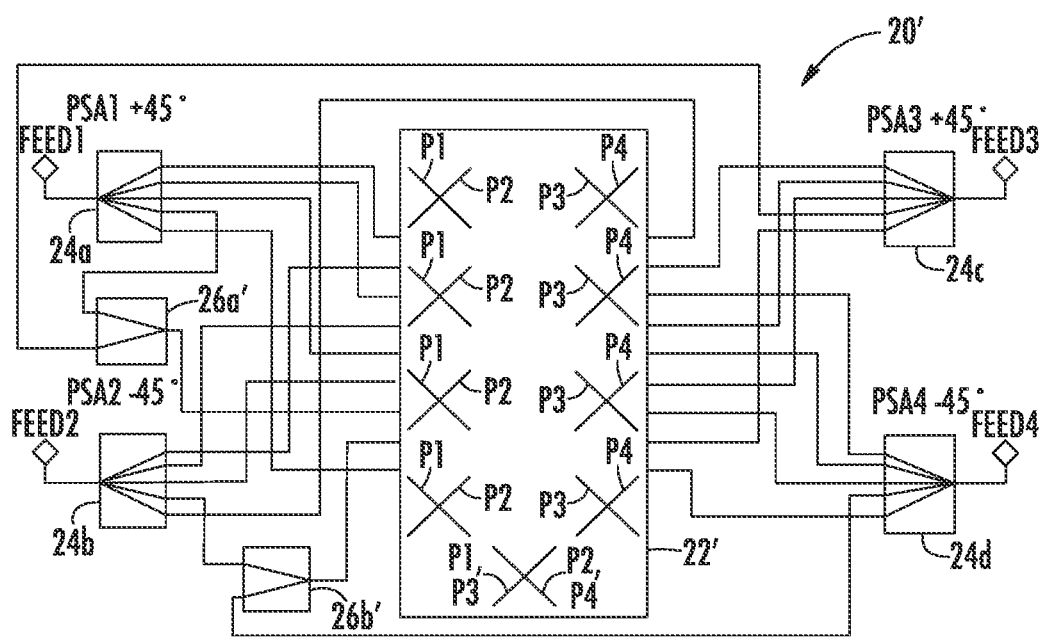
FIG. 2B is a block diagram of a base station antenna having a shared HPBW-enhancing dual-polarized radiating element therein, according to an embodiment of the present invention.

Referring now to FIG. 2B, a base station antenna 20' according to another embodiment of the invention is illustrated as including eight (8) dual-polarized radiating elements that are driven to radiate along respective pairs of mutually perpendicular (+45°, −45°) polarization planes (P1, P2) and (P3, P4) in respective left and right columns, as shown. In the left column and array, the four aligned radiating elements are driven in a conventional manner by a pair of a phase-shifter assemblies (PSA1, PSA2) 24a-24b, which are responsive to a corresponding pair of radio frequency feed signals (FEED1, FEED2). Similarly, in the right column and array, the four aligned radiating elements are driven by a pair of a phase-shifter assemblies (PSA3, PSA4) 24c-24d, which are responsive to a corresponding pair of radio frequency feed signals (FEED3, FEED4). A single shared radiating element is also provided at the bottom center of the antenna assembly 22'. This shared radiating element is driven by the phase-shifter assemblies 24a-24d and corresponding power combiners 26a'-26b' to radiate at somewhat reduced power levels along two pairs of polarization planes (P1, P3; P2, P4).

The power combiners 26a' and 26b' of FIG. 2B and the power combiners 26a-26d of FIG. 2A have corresponding pairs of input terminals responsive to phase-shifted "feed" signals generated by the phase-shifter assemblies 24a-24d, as shown. The power combiners 26a-26d and 26a' and 26b' of FIGS. 2A-2B may comprise, for example, three port power combiners or four port power combiners where the fourth port is terminated. According to some aspects of these embodiments of the invention, the power combiners 26a-26d and 26a'-26b' may be configured as Wilkinson power dividers, T-junction power dividers, branch line couplers and 3 dB couplers, for example. In some embodiments of the invention, asymmetric (i.e., non-3 dB) power dividing couplers may be used. For example, two radiating elements can be shared at the top and bottom of the antenna assembly 22 with unequal power dividing amongst the polarization planes P1-P4, but potentially subject to the constraint that the total power radiating from the top and bottom radiating elements is equal.

Figure 2C:
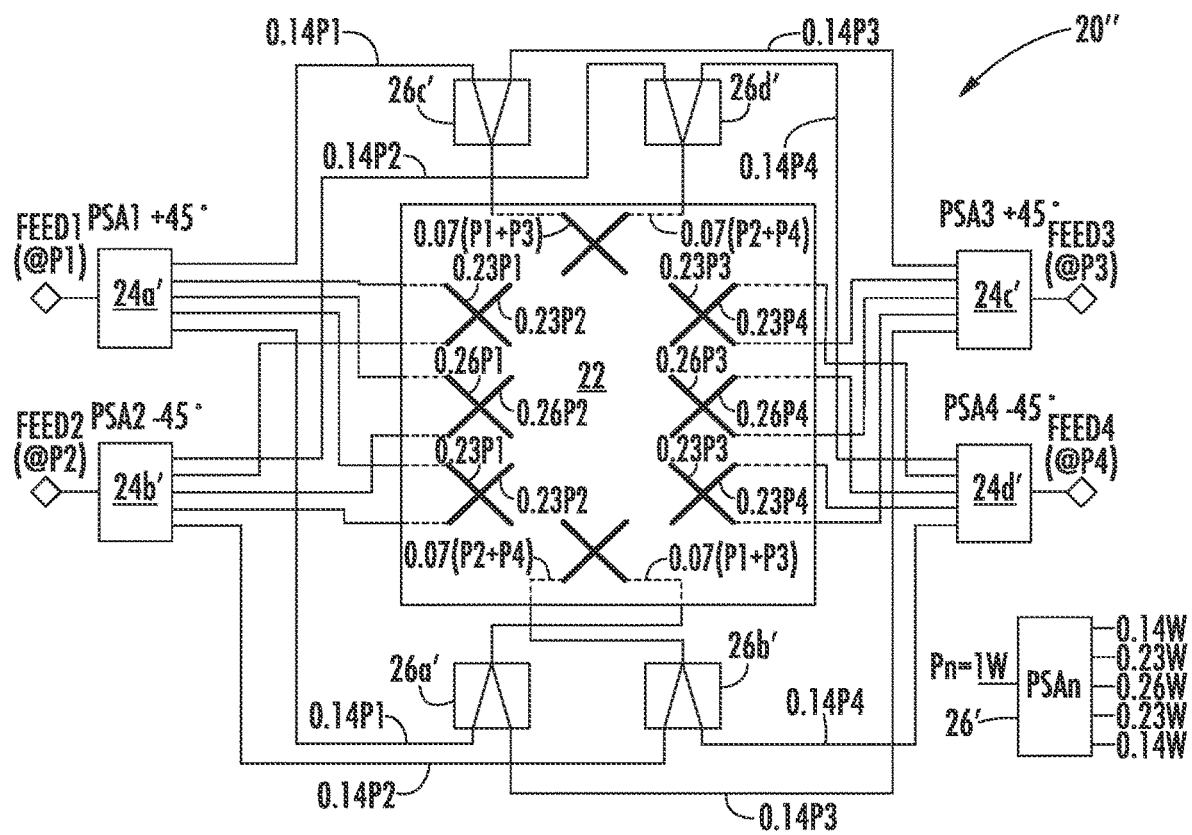
FIG. 2C is a more detailed block diagram of an example implementation of the base station antenna of FIG. 2A.

Referring next to FIG. 2C, a base station antenna 20" with antenna assembly 22 is provided, which corresponds to the antenna 20 of FIG. 2A. Each phase-shifter assembly (PSA1-PSA4) 24a'-24d' is configured to generate five (5) phase-shifted output signals at reduced power levels: 0.14Pn, 0.23Pn, 0.26Pn, 0.23Pn and 0.14Pn, where: "Pn" corresponds to the input power associated with a corresponding feed signal FEED1-FEED4, for n=1, 2, 3 or 4, and 0.14 W+0.23 W+0.26 W+0.23 W+0.14 W=Pn=1 Watt. Moreover, in the event the power combiners 26a'-26d' are configured as Wilkinson power dividers (providing 50% power loss), the eight RF signals generated by the four phase-shifter assemblies PSA1 24a', PSA2 24b', PSA3 24c' and PSA4 24d', which have power levels of 0.14Pn, will be provided to the top and bottom shared radiating elements as: (0.07P1+ 0.07P3) and (0.07P3+0.07P4), as illustrated.

Figure 3A:
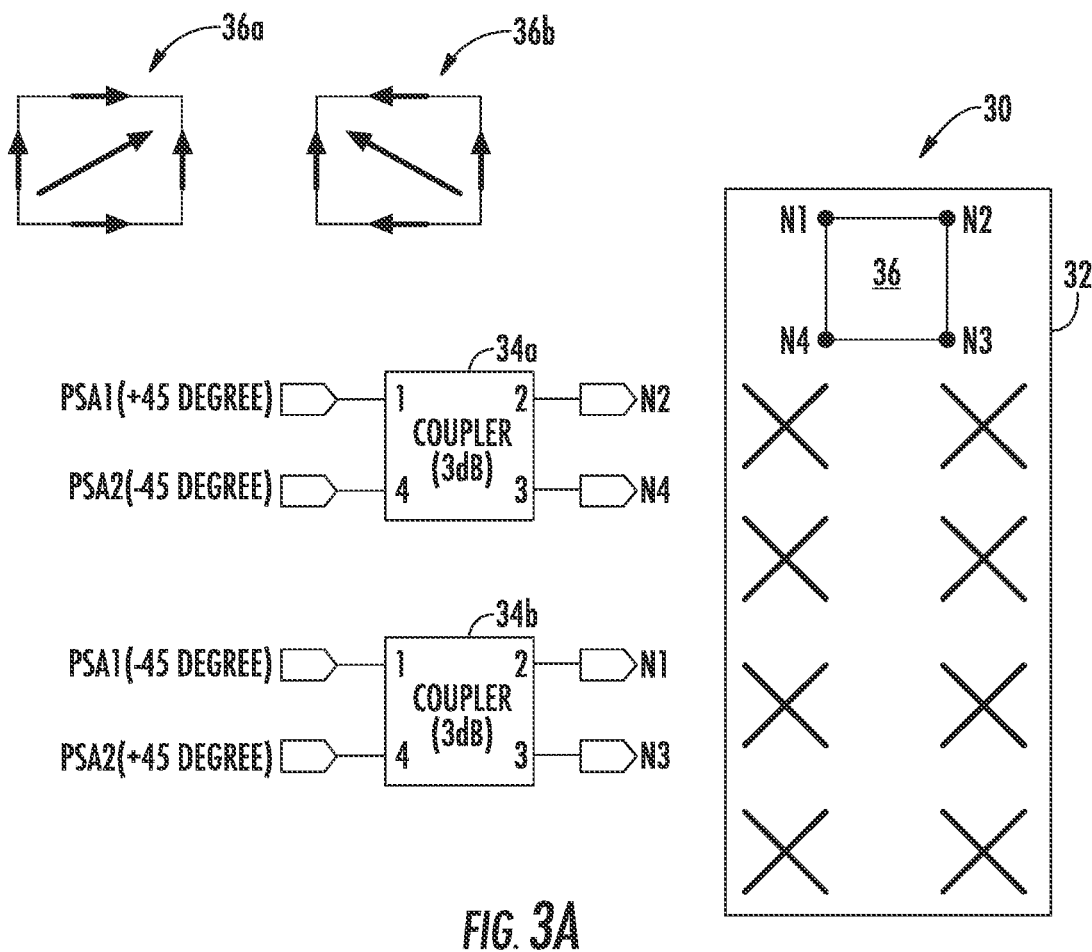
FIG. 3A is a block diagram of a base station antenna having a shared HPBW-enhancing loop radiating element therein, according to an embodiment of the present invention.
Figure 3B:
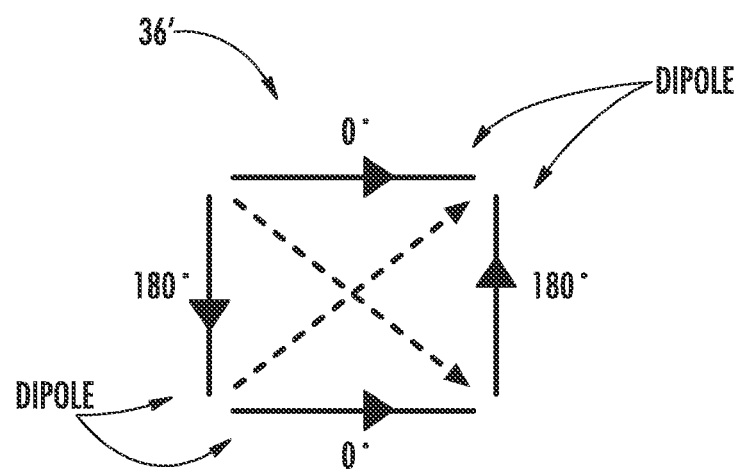
FIG. 3B is a schematic diagram of four dipole radiating elements configured as a box dipole to thereby support slant polarization, which may be substituted for the loop radiating element of FIG. 3A, according to an embodiment of the present invention.

Referring now to FIGS. 3A-3B, an antenna assembly 32 within a base station antenna 30 according to further embodiments of the invention may utilize one or more "shared" radiating elements having a unique configuration relative to the left and right columns of radiating elements. For example, in FIG. 3A, a shared radiating element may be configured as a large loop radiator 36 having opposing corners (N1, N3) and (N2, N4) that can be excited to support slant polarizations (see, e.g., 36a, 36b) with increased energy efficiency (i.e., less wasted power) vis-a-vis the embodiment of FIG. 2B. As will be understood by those skilled in the art, a perimeter of the loop radiator 36 may have a length equivalent to one wavelength (typically corresponding to the center frequency of the feed signal band), with each side being one-quarter of the wavelength (i.e., $\lambda/4$). As shown, the corners N1-N4 can be excited (via baluns, not shown) by corresponding pairs of signals generated at outputs of respective power combiners/couplers 34a, 34b. Alternatively, and as shown by FIG. 3B, the loop radiator 36 of FIG. 3A may be replaced by a rectangular arrangement 36' of four (4) dipoles, which are configured to support a pair of 180° phase shifts between two adjacent dipoles. Based on this configuration, each pair of adjacent dipoles operate to generate a corresponding slant polarized signal. It will be appreciate that the loop radiators 36, 36' may have other shapes that can be excited to support slant polarizations.

Figure 4:
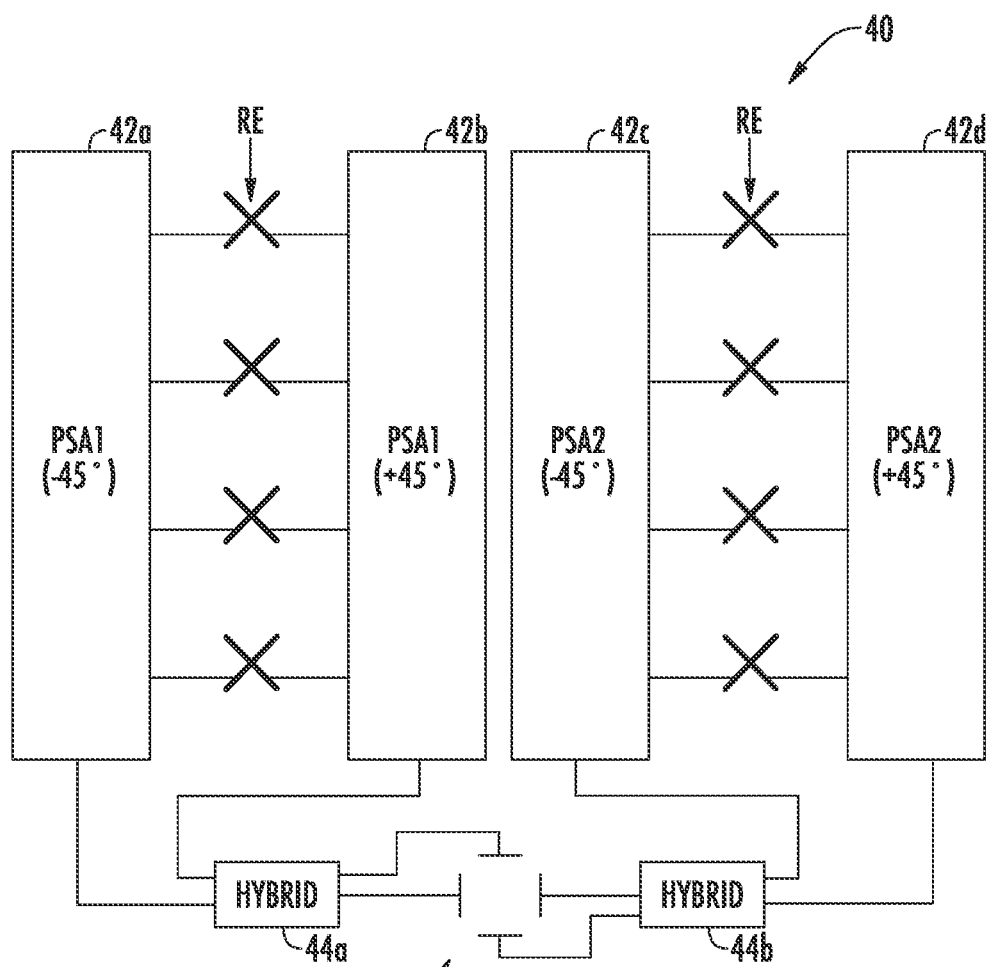
FIG. 4 is a block diagram of a base station antenna that utilizes a pair of hybrid couplers and a shared radiating element therein, according to an embodiment of the present invention.

Referring now to FIG. 4, a base station antenna 40 according to a further embodiment of the invention is illustrated as including eight (8) dual-polarized radiating elements RE that are driven to radiate along respective pairs of mutually perpendicular (+45°, −45°) polarization planes in respective left and right columns, as shown. In the left column, the four aligned radiating elements RE are driven in a conventional manner by a pair of phase-shifter assemblies (PSAs) 42a-42b. And, in the right column, the four aligned radiating elements are driven in a conventional manner by another pair of phase-shifter assemblies (PSAs) 42c-42d. In addition, a shared radiating element 46 may be provided, which is driven by a pair of hybrid couplers 44a, 44b. As illustrated in FIG. 4, the shared radiating element 46 can be configured as a rectangular arrangement of four dipoles (a box dipole) and the hybrid couplers 44a, 44b may be configured as branch-line couplers, directional couplers and rat race couplers, for example.

Figure 5A:
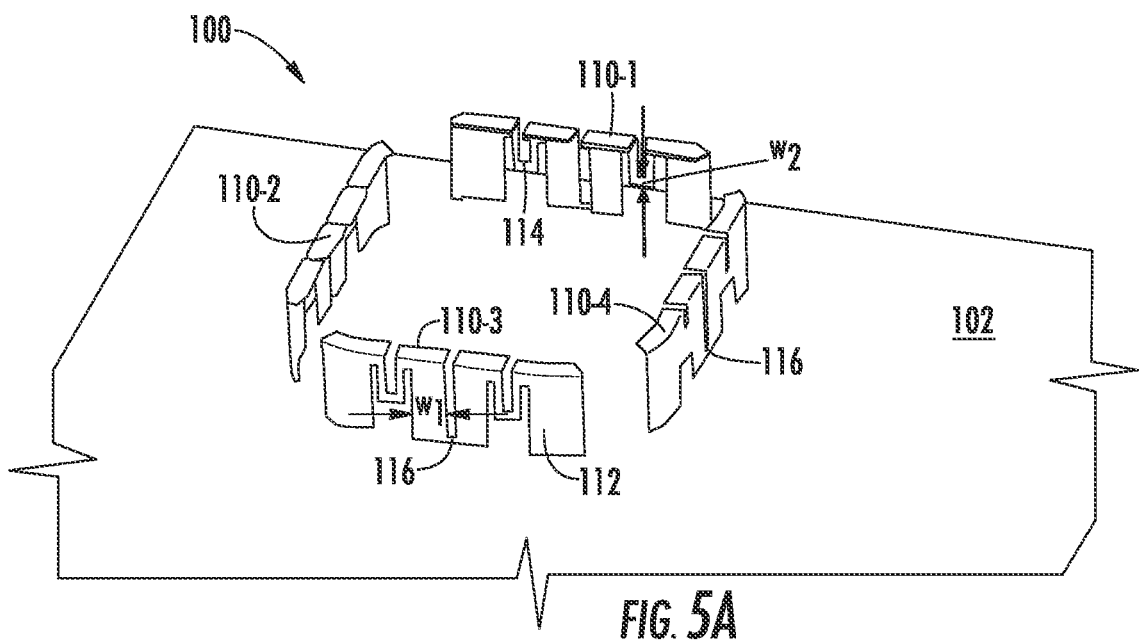
FIG. 5A is schematic perspective view of a box dipole radiating element that may be used as the shared radiating element in the base station antenna of FIG. 4.
Figure 5B:
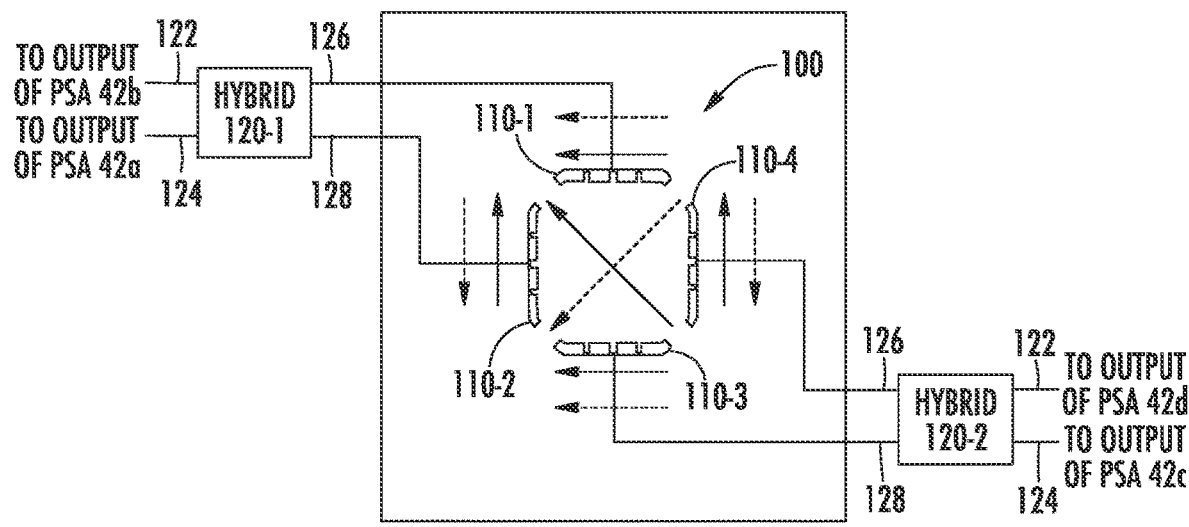
FIG. 5B is a front view of the box dipole radiating element of FIG. 5A that illustrates a method of feeding the box dipole to generate slant +45° and −45° polarization antenna beams.

FIGS. 5A-5B schematically illustrate one possible implementation pursuant to embodiments of the present invention of the shared radiating element 46 of FIG. 4. In the embodiment illustrated in FIGS. 5A and 5B, the shared radiating element 46 of FIG. 4 is implemented as a shared box dipole radiating element 100. FIG. 5A is schematic perspective view of the box dipole radiating element 100, while FIG. 5B is a front view of the shared box dipole radiating element 100 that illustrates a method feeding the shared box dipole radiating element to generate slant +45° and −45° polarization antenna beams.

As shown in FIG. 5A, the shared box dipole radiating element 100 includes first through fourth dipole radiators 110-1 through 110-4 that are arranged to define a square. Each dipole arm 110 may have a length that is, for example, a half wavelength or less, where the wavelength is the wavelength corresponding to the lowest frequency in the operating frequency band of the shared box dipole radiating element 100. The dipole arms 110 are not electrically connected to each other. In the depicted embodiment, each dipole radiator 110 is implemented as a stamped metal dipole radiator that is formed into the shape shown in FIG. 5A. Each dipole radiator 110 is mounted roughly one quarter wavelength or less in front of a conductive reflector 102 which may be, for example, the main reflector of a base station antenna. While not shown in FIG. 5A, "stalk" printed circuit boards or other feed structures may be used to mount each dipole radiator 110 at the appropriate distance in front of the reflector 102, and each stalk printed circuit board may include a balun. Coaxial cables (not shown) may provide electrical connections between the outputs of the hybrid couplers 44a, 44b (see FIG. 4) and the respective stalk printed circuit boards. Each dipole radiator 110 may be center fed by soldering a lower central portion 116 of each dipole radiator 110 to the stalk printed circuit board (not shown) to electrically connect each dipole radiator 110 to a respective RF transmission line (not shown) that connects to a respective output of the hybrid couplers 44a, 44b.

Figure 5C:
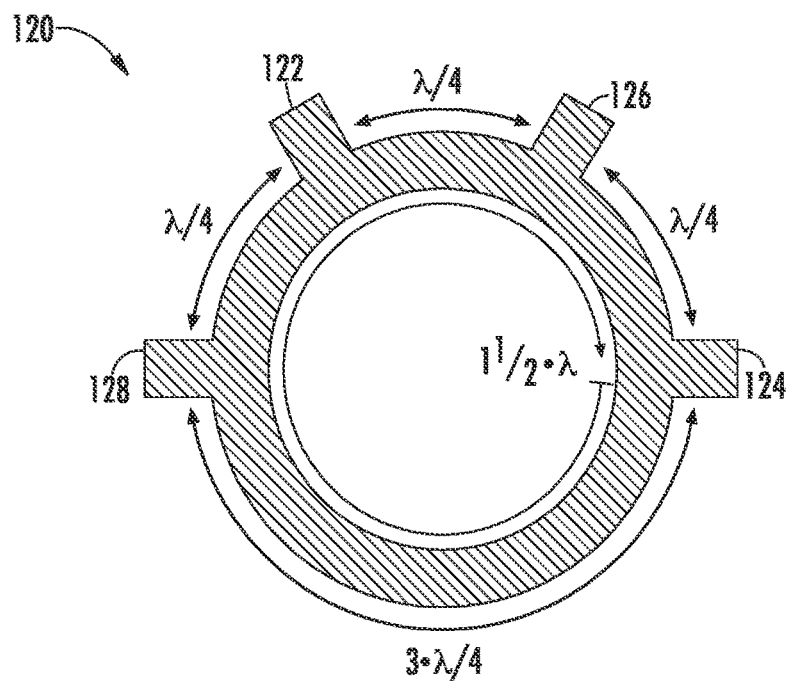
FIG. 5C is a schematic diagram illustrating the circuit design of a rat race coupler that may be used in base station antennas according to embodiments of the present invention.
Figure 5D:
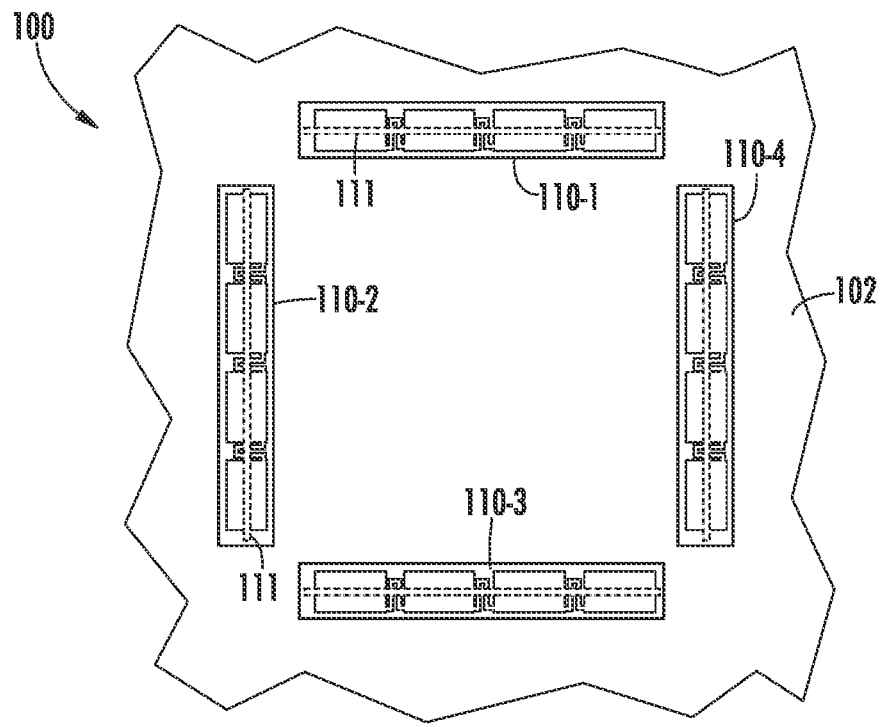
FIG. 5D is a schematic front view of a printed circuit board based shared box dipole radiating element according to further embodiments of the present invention.

It will be appreciated that, in other embodiments, different techniques may be used to form the dipole radiators 110. For example, as shown in FIG. 5D, the dipole radiators 110 may be formed on printed circuit boards in other embodiments, and feed stalks 111 that have each include a balun (the feed stalks 111 may also be implemented as printed circuit boards and are shown using dotted lines in FIG. 5D as they are hidden by the dipole radiators 110) may be used to mount each printed circuit board based dipole radiators 110 forwardly of the reflector 102 and to pass RF signals between the printed circuit board based dipole radiators 110 and coaxial cables that connect to the outputs of the hybrid couplers 44a, 44b. Likewise, it will also be appreciated that the dipole radiators 110 may be oriented differently in additional embodiments. For example, the dipole radiators 110 illustrated in FIG. 5A each define a respective plane that is generally perpendicular to the plane defined by the reflector 102. In contrast, the dipole radiators 110 illustrated in FIG. 5D each define a respective plane that is generally parallel to the plane defined by the reflector 102. Thus, it will be appreciated that each dipole radiator 110 illustrated in FIG. 5A could be rotated 90° so as to be parallel to the reflector 102, and/or that each dipole radiator 110 illustrated in FIG. 5D could be rotated 90° so as to be perpendicular to the reflector 102. Other orientations are possible, and not all of the dipole radiators need be at the same orientation.

Referring again to FIG. 5A, in the depicted embodiment, each dipole radiator 110 includes a plurality of widened conductive segments 112 that are electrically connected by at least one narrow conductive segment 114. Each widened conductive segment 112 may have a respective width $W_1$, where the width $W_1$ is measured in a direction that is generally perpendicular to the direction of current flow along the respective widened conductive segment 112. The width $W_1$ of each widened conductive segment 112 need not be constant, and hence in some instances reference will be made to the average width of each widened conductive segment 112. The narrow conductive segments 114 may similarly have a respective width $W_2$, where the width $W_2$ is measured in a direction that is generally perpendicular to the direction of instantaneous current flow along the narrow conductive segment 114. The width $W_2$ of each narrow conductive segment 114 also need not be constant, and hence in some instances reference will be made to the average width of each narrow conductive segment 114.

The narrow conductive segments 114 may be implemented as meandered conductive traces. Herein, a meandered conductive trace refers to a non-linear conductive trace that follows a meandered path to increase the path length thereof. By meandering the conductive traces, the length of the narrow conductive segments 114 may be extended while still providing relatively compact narrow conductive segments 114. The meandered conductive traces 114 may act as inductors. The average width of each widened conductive segment 112 may be, for example, at least three times the average width of each narrow conductive segment 114 in some embodiments. In other embodiments, the average width of each widened conductive segment 112 may be at least five times the average width of each narrow conductive segment 114.

Figure 1A:
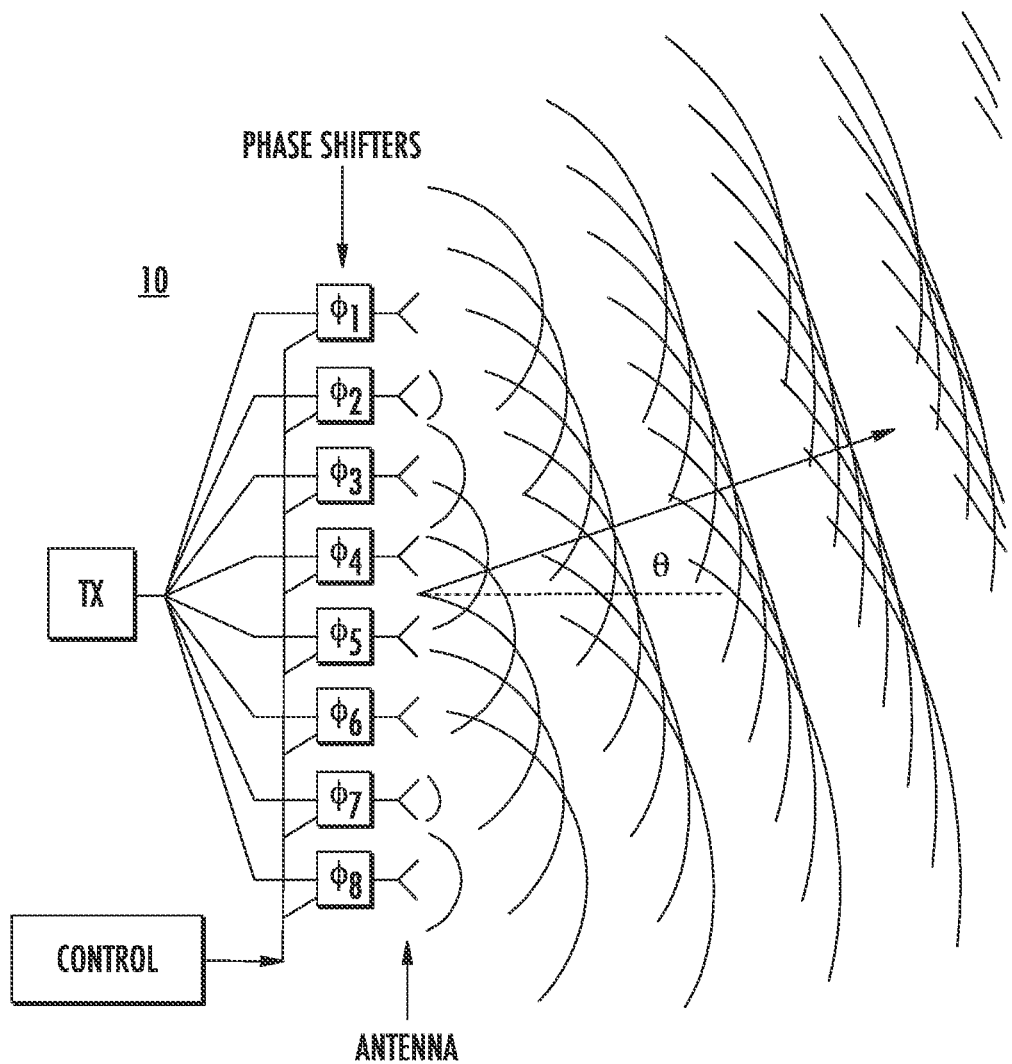
FIG. 1A is a block diagram of a phased array antenna according to the prior art.
Figure 1B:
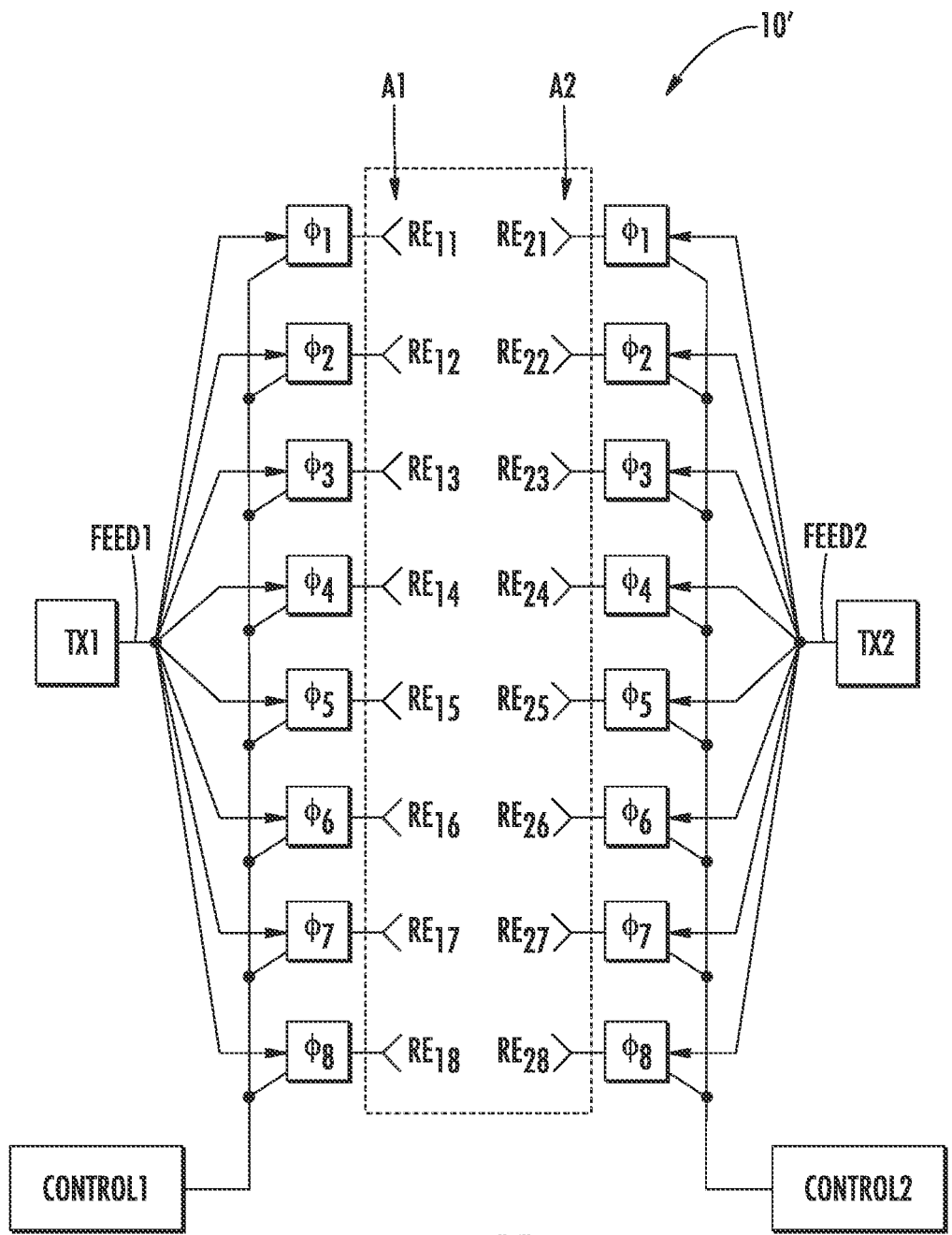
FIG. 1B is a block diagram of a base station antenna according to the prior art.
Figure 1C:
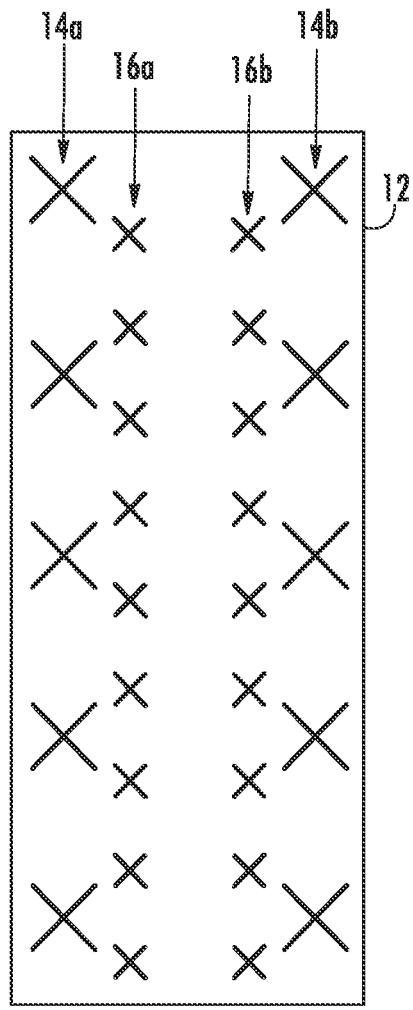
FIG. 1C is a plan layout view of a base station antenna that includes two linear arrays of low-band radiating elements and two linear arrays of high-band radiating elements, according to the prior art.
Figure 1D:
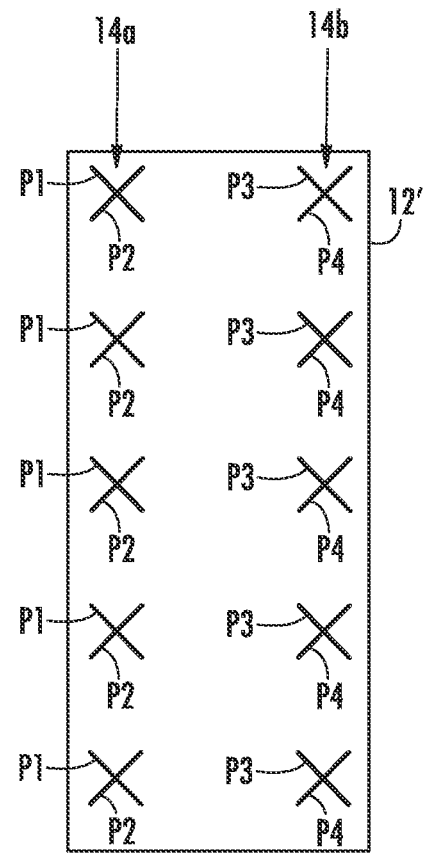
FIG. 1D is a plan layout view of a conventional antenna containing ten dual-polarized radiating elements, which are arranged into two columns of five radiating elements each.
Figure 1E:
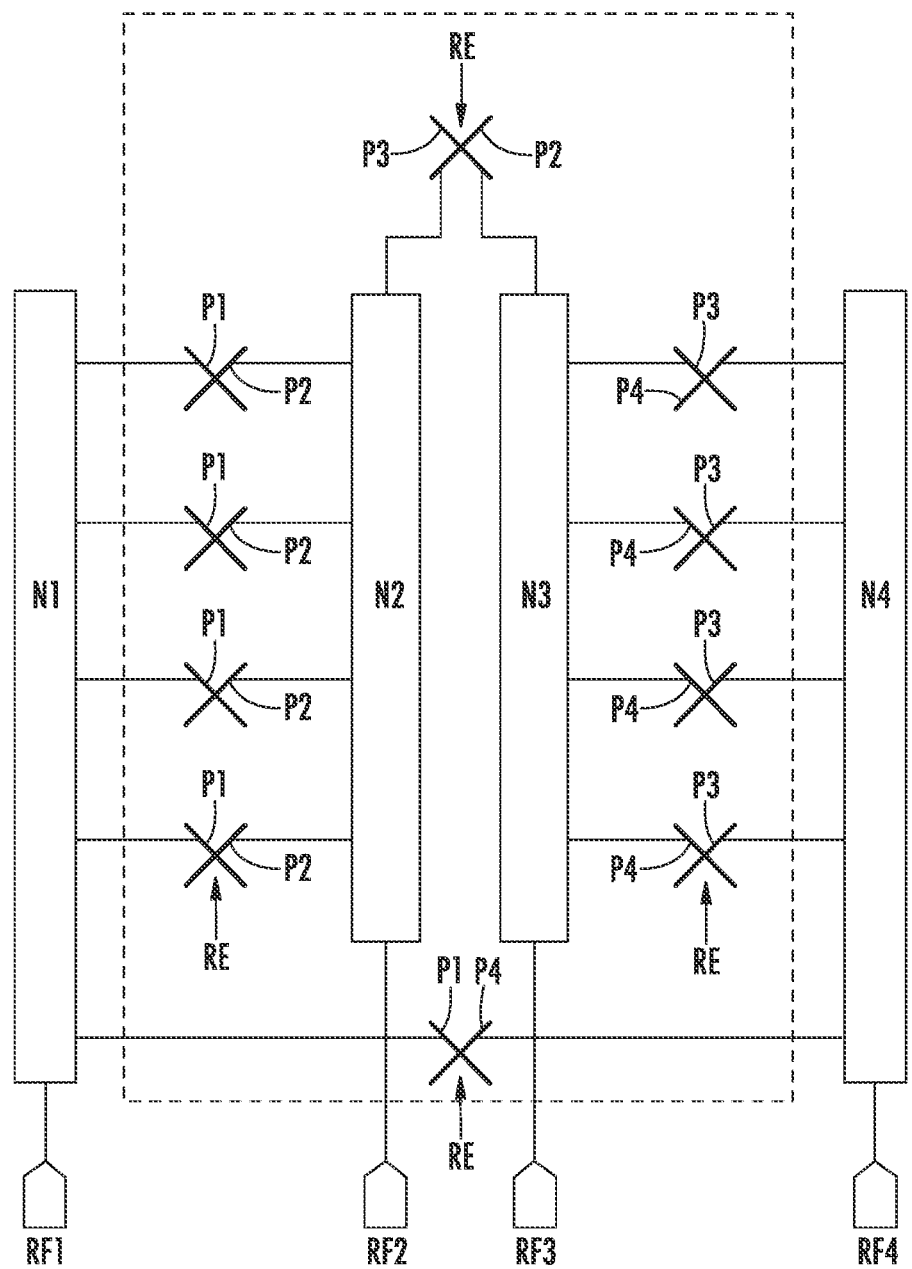
FIG. 1E is a plan layout view of a conventional antenna containing ten dual-polarized radiating elements, which are arranged into two columns of four radiating elements with top and bottom radiating elements located intermediate the two columns.

The dipole arms may be implemented as a series of widened conductive segments 112 that are connected by narrow conductive segments 114 in order to improve the performance of other arrays included in the antenna. For example, while not shown in FIG. 4, the base station antenna 40 of FIG. 4 may further include one or more arrays of radiating elements (not shown) that operate in a higher frequency band than the radiating elements RE shown in FIG. 4. As one specific example, the two columns 16a, 16b of high-band radiating elements included in the antenna 12 of FIG. 1C could be added to the base station antenna 40 of FIG. 4. When such higher band radiating elements transmit and receive signals, they may tend to induce currents on the dipole radiators 110 of low-band radiating element 100. As a result, the radiation patterns generated by the array(s) 16a, 16b of high-band radiating elements may be distorted due to the currents induced on the dipole radiators 110. The narrow conductive segments 114 may act as high impedance sections that are designed to interrupt currents in a higher frequency range that could otherwise be induced on the dipole radiators 110 without significantly impacting the ability of the low-band currents to flow on the dipole radiators 110. As such, the narrow conductive segments 114 may reduce induced high-band currents on the dipole radiators 110 and consequent disturbance to the antenna pattern of the higher band array. In some embodiments, the narrow conductive segments 114 may make the shared box dipole radiating element 100 almost invisible to the higher band radiation so that the shared box dipole radiating element 100 will not distort the radiation patterns of the higher band arrays.

The shared box dipole radiating element 100 may be configured to transmit and receive RF signals at both a slant 45° polarization and at a slant −45° polarization. FIG. 5B illustrates a phasing for the RF signals that are fed from the hybrid couplers 44a, 44b of FIG. 4 to the shared box dipole radiating element 100 that will result in the shared box dipole radiating element 100 radiating RF energy at slant +45°/−45° polarizations. The hybrid couplers 44a, 44b of FIG. 4 are renumbered 120-1, 120-2 in FIG. 5B. The connections between the hybrid couplers 120-1, 120-2 and the shared box dipole radiating element 100 are illustrated in FIG. 5B for clarity.

As shown in FIG. 5B, each hybrid coupler 120 includes first and second input ports 122, 124 and first and second output ports 126, 128. As shown in FIGS. 4 and 5B, the first input port 122 of hybrid coupler 120-1 is coupled to an output of the +45° phase shifter assembly 42b and the second input port 124 of hybrid coupler 120-1 is coupled to an output of the −45° phase shifter assembly 42a, while the first input port 122 of hybrid coupler 120-2 is coupled to an output of the +45° phase shifter assembly 42d and the second input port 124 of hybrid coupler 120-2 is coupled to an output of the −45° phase shifter assembly 42c. In FIG. 5B, the dotted arrows beside dipole radiators 110-1, 110-2 illustrate the direction of current flow along those dipole radiators in response to feed signals input to the first input port 122 of hybrid coupler 120-1, while the dotted arrows beside dipole radiators 110-3, 110-4 illustrate the direction of current flow along those dipole radiators in response to feed signals input to the second input port 124 of hybrid coupler 120-2. Similarly, the solid arrows beside dipole radiators 110-1, 110-2 illustrate the direction of current flow along those dipole radiators in response to feed signals input to the second input port 124 of hybrid couplers 120-1, while the solid arrows beside dipole radiators 110-3, 110-4 illustrate the direction of current flow along those dipole radiators in response to feed signals input to the second input port 124 of hybrid coupler 120-2.

As shown in FIG. 5B, when an RF signal is input to input port 122 of hybrid coupler 120-1, the hybrid coupler generates a pair of signals that are output at ports 126, 128 and fed to dipole radiators 110-1, 110-2, respectively. The RF signal passed to dipole radiator 110-1 generates a current that passes from right to left along dipole radiator 110-1, while the RF signal passed to dipole radiator 110-2 generates a current that passes from top to bottom along dipole radiator 110-2, as shown by the dotted arrows next to dipole radiators 110-1, 110-2. As shown by the dotted arrow in the middle of shared box dipole radiating element 100, the currents induced along dipole radiators 110-1 and 110-2 in response to the signal input to input port 122 of hybrid coupler 120-1 will radiate from dipole radiators 110-1, 110-2 at a slant +45° polarization to generate an antenna beam having a +45° polarization. Input ports 122 of hybrid couplers 120-1, 120-2 are depicted using dotted lines in FIG. 5B as RF signals input to input ports 122 generate the currents shown by the dotted arrows in FIG. 5B.

Similarly, when an RF signal is input to input port 124 of hybrid coupler 120-1, the hybrid coupler generates a pair of signals that are output at ports 126, 128 and fed to dipole radiators 110-1, 110-2, respectively. The RF signal passed to dipole radiator 110-1 generates a current that passes from right to left along dipole radiator 110-1, while the RF signal passed to dipole radiator 110-2 generates a current that passes from bottom to top along dipole radiator 110-2, as shown by the solid arrows next to dipole radiators 110-1, 110-2. As shown by the solid arrow in the middle of shared box dipole radiating element 100, the currents induced along dipole radiators 110-1 and 110-2 in response to the signal input to input port 124 of hybrid coupler 120-1 will radiate from dipole radiators 110-1, 110-2 at a slant −45° polarization to generate an antenna beam having a −45° polarization.

Signals input from hybrid coupler 120-2 to the shared box dipole radiating element act in a similar fashion. In particular, when an RF signal is input to input port 122 of hybrid coupler 120-2, the hybrid coupler generates a pair of signals that are output at ports 126, 128 and fed to dipole radiators 110-3, 110-4, respectively. The RF signal passed to dipole radiator 110-3 generates a current that passes from right to left along dipole radiator 110-3, while the RF signal passed to dipole radiator 110-4 generates a current that passes from top to bottom along dipole radiator 110-4, as shown by the dotted arrows next to dipole radiators 110-3, 110-4. As shown by the dotted arrow in the middle of shared box dipole radiating element 100, the currents induced along dipole radiators 110-3 and 110-4 in response to the signal input to input port 122 of hybrid coupler 120-2 will radiate from dipole radiators 110-3, 110-4 at a slant +45° polarization to generate an antenna beam having a +45° polarization.

Similarly, when an RF signal is input to input port 124 of hybrid coupler 120-2, the hybrid coupler generates a pair of signals that are output at ports 126, 128 and fed to dipole radiators 110-3, 110-4, respectively. The RF signal passed to dipole radiator 110-3 generates a current that passes from right to left along dipole radiator 110-3, while the RF signal passed to dipole radiator 110-4 generates a current that passes from bottom to top along dipole radiator 110-4, as shown by the solid arrows next to dipole radiators 110-3, 110-4. As shown by the solid arrow in the middle of shared box dipole radiating element 100, the currents induced along dipole radiators 110-3 and 110-4 in response to the signal input to input port 124 of hybrid coupler 120-2 will radiate from dipole radiators 110-3, 110-4 at a slant −45° polarization to generate an antenna beam having a −45° polarization.

Figure 5E:
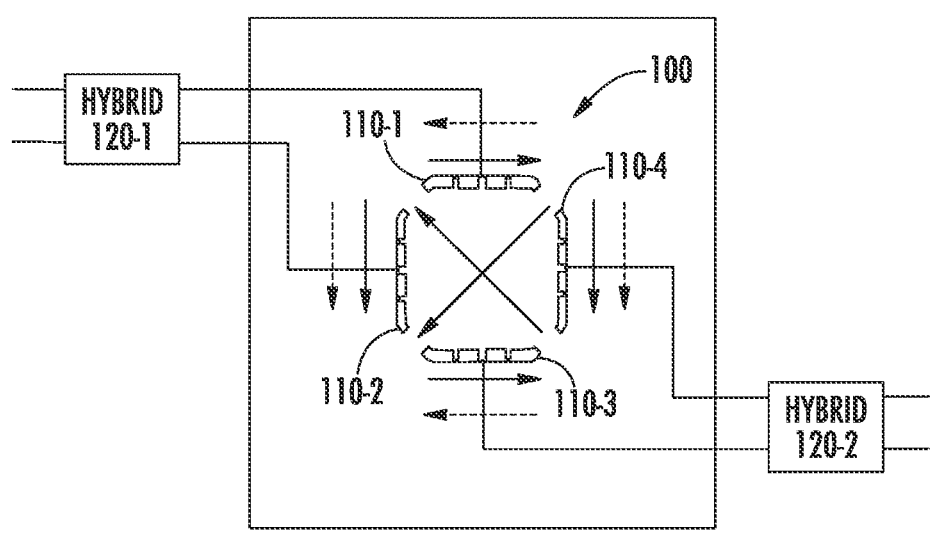
FIG. 5E is a front view of the box dipole radiating element of FIG. 5A that illustrates an alternative method of feeding the box dipole to generate slant +45° and −45° polarization antenna beams.

It will be appreciated that phasing arrangements may be used other than the phasing arrangement shown in FIG. 5B in order to excite the shared dipole radiating element 100 to transmit two slant −45° polarized RF signals and two slant +45° polarized RF signals. For example, FIG. 5E illustrates an alternative method for phasing the RF signals that are fed from the hybrid couplers 120-1, 120-2 to the shared box dipole radiating element 100. As shown in FIG. 5E, the arrangement is almost identical to what is shown in FIG. 5B, except that in the embodiment of FIG. 5B the currents have the same direction on the "horizontal" dipole radiators 110-1 and 110-3 and different directions on the "vertical" dipole radiators 110-2 and 110-4, whereas in the embodiment of FIG. 5E the currents have the same direction on the vertical dipole radiators 110-2 and 110-4 and different directions on the horizontal dipole radiators 110-1 and 110-3.

As is readily apparent from the above discussion, hybrid coupler 120-1 should be configured so that RF signals input at port 122 will be split equally and output as in-phase signals at ports 126, 128, while RF signals input at port 124 will be split equally and output as out-of-phase signals at ports 126, 128. Likewise, hybrid coupler 120-2 should be configured so that RF signals input at port 122 will be split equally and output as in-phase signals at ports 126, 128, while RF signals input at port 124 will be split equally and as output out-of-phase signals at ports 126, 128.

Rat race couplers are a known type of hybrid coupler that may be used to equally split an RF signal applied to a first input port thereof into two equal and in-phase output signals, and to equally split an RF signal applied to a second input port thereof into two equal and out-of-phase output signals. FIG. 5C is a schematic diagram of a rat race coupler 120 that may be used to implement hybrid couplers 120-1 and 120-2 in FIG. 5B. Referring to FIG. 5C, an RF signal input at port 122 will travel in both directions along the rat race coupler 120, and half of the energy of the RF signal will be output at port 126 and the other half of the energy of the RF signal will be output at port 128. As a result of superposition of signals from different directions arriving at ports 126 and 128, the RF signals output at ports 126 and 128 will be in-phase with each other. Signals arriving at port 124 from both directions would cancel each other and port 124 would be electrically isolated from port 122. In contrast, an RF signal input at port 124 will travel in both directions along the rat race coupler 120, and half of the energy of the RF signal will be output at port 128 and the other half of the energy of the RF signal will be output at port 126. As a result of superposition of signals from different directions arriving at ports 126 and 128, the RF signals output at ports 126 and 128 will be out-of-phase with each other. Signals arriving at port 122 from both directions would cancel each other and port 122 would be electrically isolated from port 124. Thus, the rat race coupler 120 may provide the proper splitting and phasing of the RF signals passed to the shared box dipole radiating element 100 of FIGS. 5A-5B so that the shared box dipole radiating element 100 will generate antenna beams having slant +45° and slant −45° polarizations.

Figure 5F:
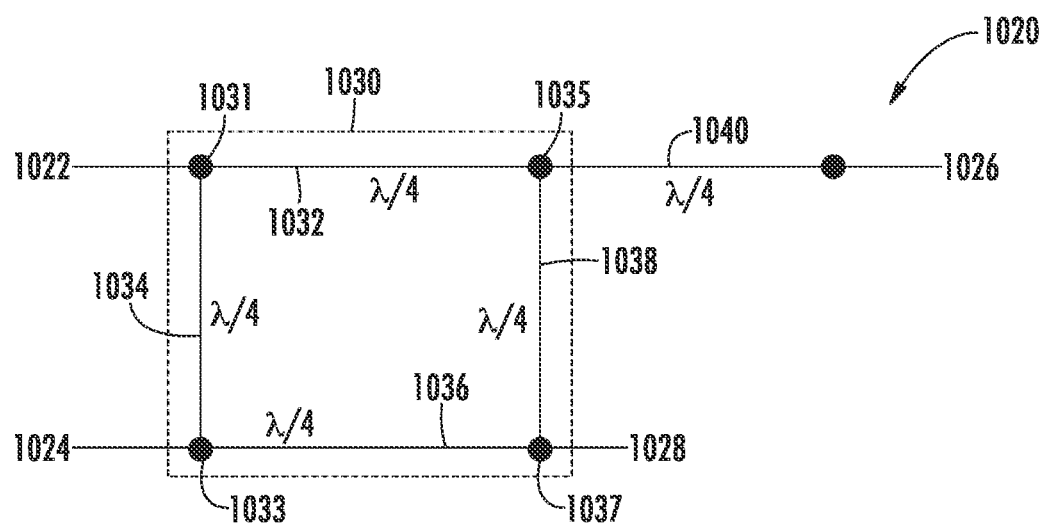
FIG. 5F is a schematic diagram illustrating the circuit design of a modified branch line coupler that may be used instead of the rat race coupler of FIG. 5C to feed the shared radiating elements according to embodiments of the present invention.

While a rat race coupler (e.g., the rat race coupler of FIG. 5C) is one convenient way of implementing the couplers 120 illustrated in FIG. 5B, it will be appreciated that embodiments of the present invention are not limited thereto. For example, FIG. 5F is a schematic diagram illustrating the circuit design of another four-port combiner 1020 that includes a branch line coupler that may be used instead of rat race couplers to implement the four-port combiners 120 of FIG. 5B. As shown in FIG. 5F, the four-port combiner 1020 includes a branch line coupler 1030 and an additional quarter-wavelength transmission line segment 1040. The branch line coupler 103 includes four quarter-wavelength transmission line segments 1032, 1034, 1036, 1038 that are electrically coupled to each other as shown. The four locations 1031, 1033, 1035, 1037 where the quarter-wavelength transmission line segments 1032, 1034, 1036, 1038 intersect form the four ports of the branch line coupler 1030. Ports 1031 and 1033 of branch line coupler 1030 act as the first and second input ports 1022, 1024 of four-port combiner 1020. One end of quarter-wavelength transmission line segment 1040 is connected to port 1035. The opposite end of quarter-wavelength transmission line segment 1040 acts as the first output port 1036 of four-port combiner 1020, and port 1037 of branch line coupler 1030 acts as the second output port 1028 of four-port combiner 1020. The four-port combiner 1020 will operate in the exact same manner as rat race coupler 120 with respect to RF signals input at the ports thereof.

Figure 5G:
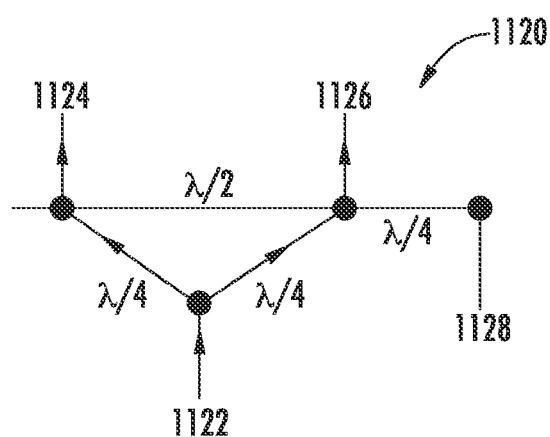
FIG. 5G is a schematic diagram illustrating the circuit design of a Wilkinson-style four-port combiner that may be used instead of the rat race coupler of FIG. 5C to feed the shared radiating elements according to embodiments of the present invention.

While FIGS. 5C and 5F illustrate two example ways of implementing the four-port combiners 44/120 illustrated in FIGS. 4 and 5B, it will be appreciated that embodiments of the present invention are not limited thereto. For example, in other embodiments, 90° hybrid couplers or other couplers could be used. Likewise, FIG. 5G illustrates a "Wilkinson-style" four-port combiner 1120 having input ports 1122, 1124 and output ports 1126, 1128 that will also operate in the same manner as rat race coupler 120. A signal input, for example, at port 1122 of four-port combiner 1120 splits with half the energy passing to port 1124 and the other half passing to port 1126. Port 1128 is isolated from port 1122 because the energy passing to port 1128 via port 1124 is 180° out-of-phase with respect to the energy passing to port 1128 via port 1126 and hence the signals cancel at port 1128. Similar operation will occur with respect to signals input at port 1128 so that port 1122 is isolated from port 1128.

When the radiating element 100 of FIGS. 5A-5B is used in place of the shared radiating element 46 of FIG. 4, the base station antenna of FIG. 4 (with this modification) includes a first linear array of radiating elements RE that is configured to transmit first polarization RF signals (e.g., −45° polarized) that are passed to the first linear array via a first feed network 42a and to transmit second polarization RF signals (e.g., +45° polarized) that are passed to the first linear array via a second feed network 42b, as well as a second linear array of radiating elements RE that is configured to transmit first polarization RF signals that are passed to the second linear array via a third feed network 42c and to transmit second polarization RF signals that are passed to the second linear array via a fourth feed network 42d. The antenna further includes a shared radiating element 46 having a first radiator (e.g., the top dipole arm 110-1 of shared radiating element 100 in FIG. 5B) that is coupled to both the first feed network 42a and to the second feed network 42b and a second radiator (e.g., the left dipole arm 110-2 of shared radiating element 100 in FIG. 5B4) that is coupled to both the first feed network 42a and the second feed network 42b. The first and second radiators 110-1, 110-2 together emit RF signals at both the first polarization and at the second polarization. The shared radiating element 100 further includes a third radiator 110-3 that is coupled to both the third feed network 42c and to the fourth feed network 42d and a fourth radiator 110-4 that is coupled to both the third feed network 42c and the fourth feed network 42d. The third and fourth radiators 110-3, 110-4 are configured so that together they emit RF signals at both the first polarization and at the second polarization.

Figure 16A:
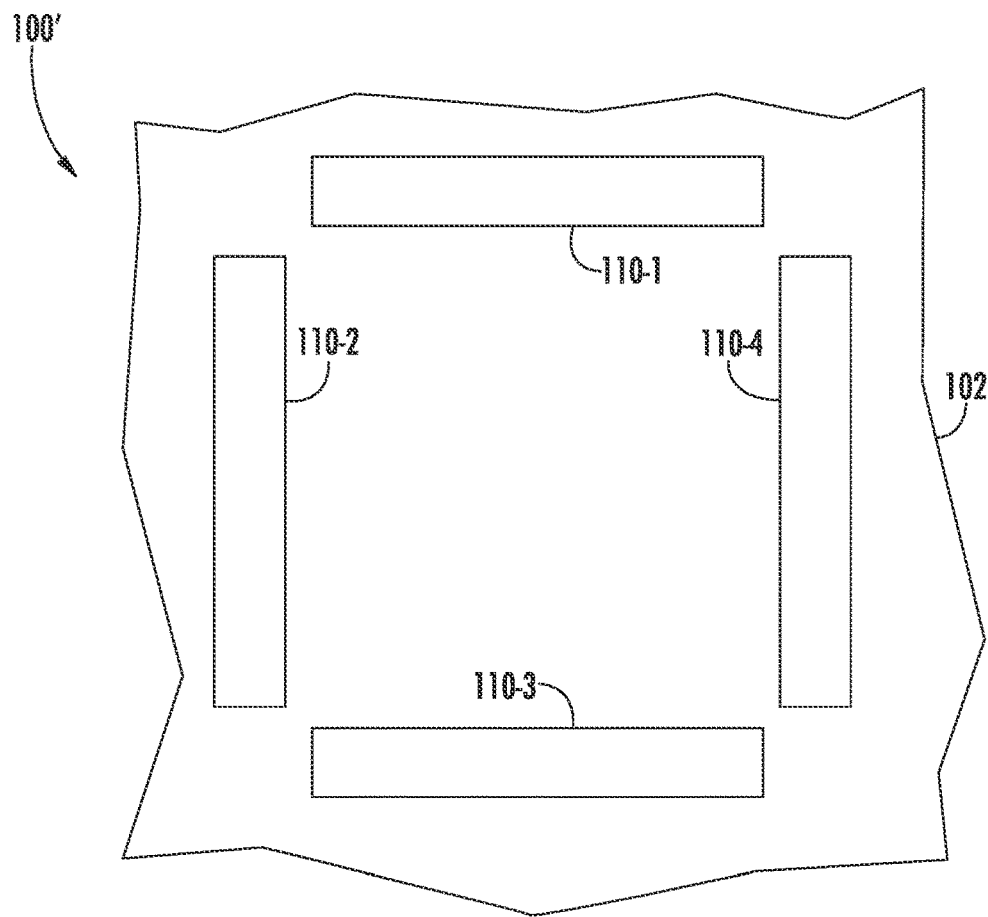
FIG. 16A is a schematic diagram of a shared radiating element according to further embodiments of the present invention that includes a plurality of slot radiators.

It will also be appreciated that the shared radiating elements according to embodiments of the present invention are not limited to radiating elements that have dipole radiators. Instead, the shared radiating element may be comprised of any appropriate radiators. For example, FIG. 16A is a schematic diagram of a shared radiating element 100' according to further embodiments of the present invention that includes a plurality of slot radiators 110-1 through 110-4. Horn radiators could be used in still other embodiments. Thus, it will be appreciated that embodiments of the present invention are not limited to shared radiating elements that have dipole radiators.

Figure 16B:
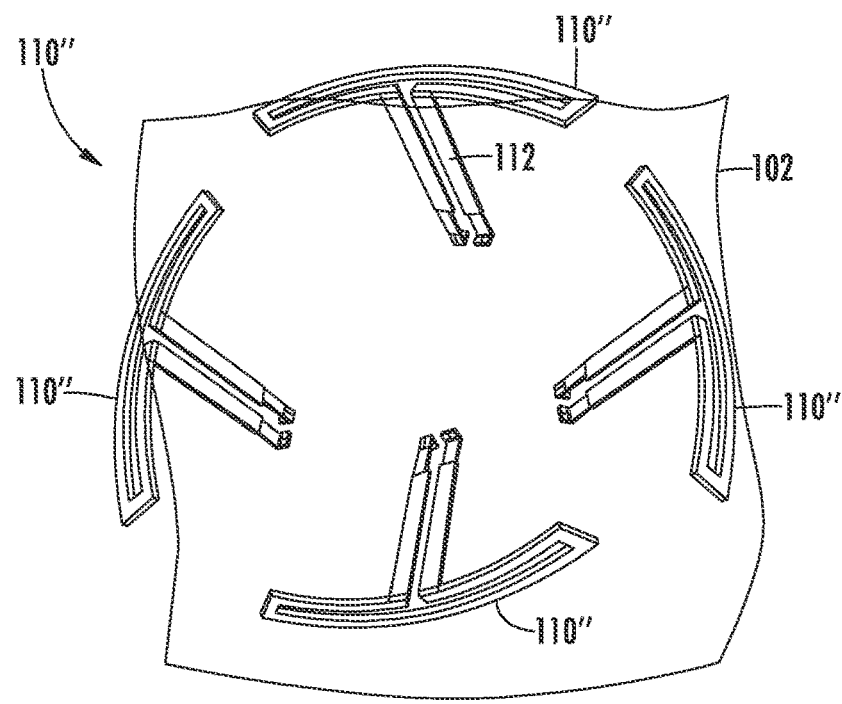
FIGS. 16B-16D are schematic diagrams of three additional shared radiating elements that may be used in the base station antennas according to embodiments of the present invention.

FIG. 16B schematically illustrates another shared box dipole radiating element 100" that may be used in the base station antennas according to embodiments of the present invention. As shown in FIG. 16B, the shared box dipole radiating element 100" has four dipole radiators 110" which are mounted by feed stalks 112 forwardly of a reflector 102. As can be seen, the dipole radiators 110 in this embodiment are formed as center-fed folded dipole radiators.

Figure 16C:
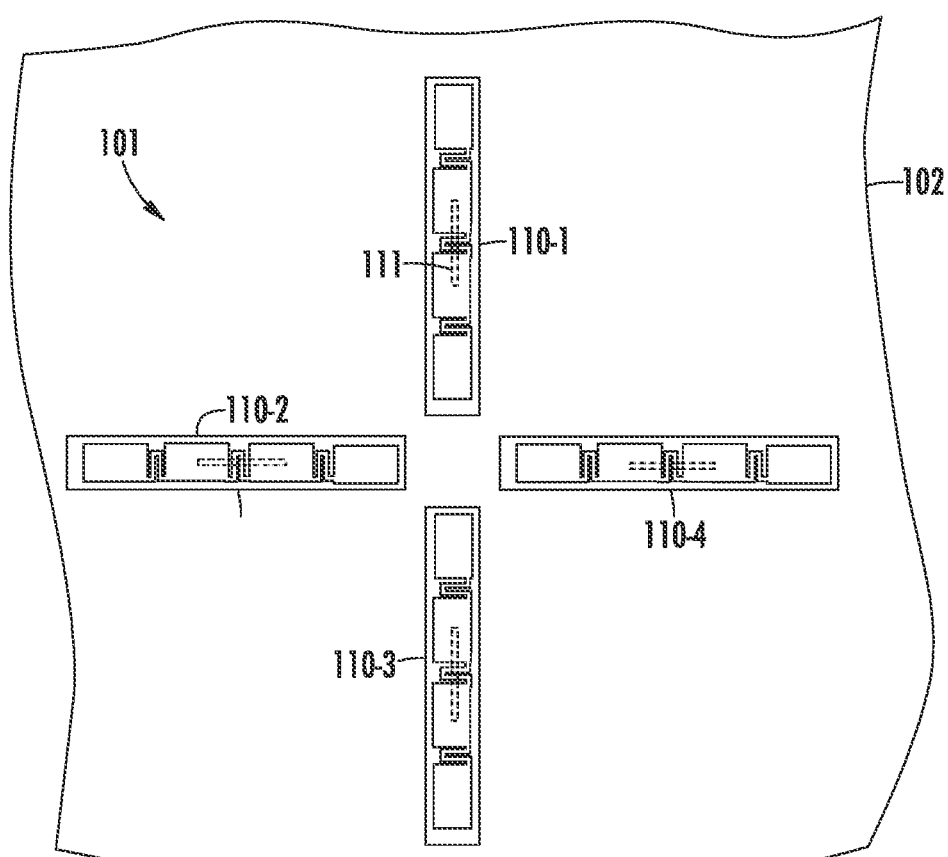

As another example, FIG. 16C is a schematic front view of a shared radiating element 101 that includes four dipole radiators 110-1 through 110-4 that are mounted on feed stalks 111 to extend forwardly from a reflector 102 of a base station antenna. As shown in FIG. 16C, each dipole radiator 110 has the same design as the dipole radiators 110 of the box radiating element 100 of FIG. 5D. It will be appreciated, however, that any appropriate dipole radiator design may be used. In FIG. 16C, the dipole radiators 110 are no longer disposed to form a box, but instead are arranged in the shape of a cross. As will be understood by those of skill in the art, if the RF signals input to the dipole radiators 110 are phased appropriately, the radiating element 110 may be designed to form the same four antenna beams as the box dipole radiating element 100 discussed above. The radiating element 101 may be fed by a pair of four-port combiners in the same general fashion as box dipole radiating element 100.

Figure 16D:
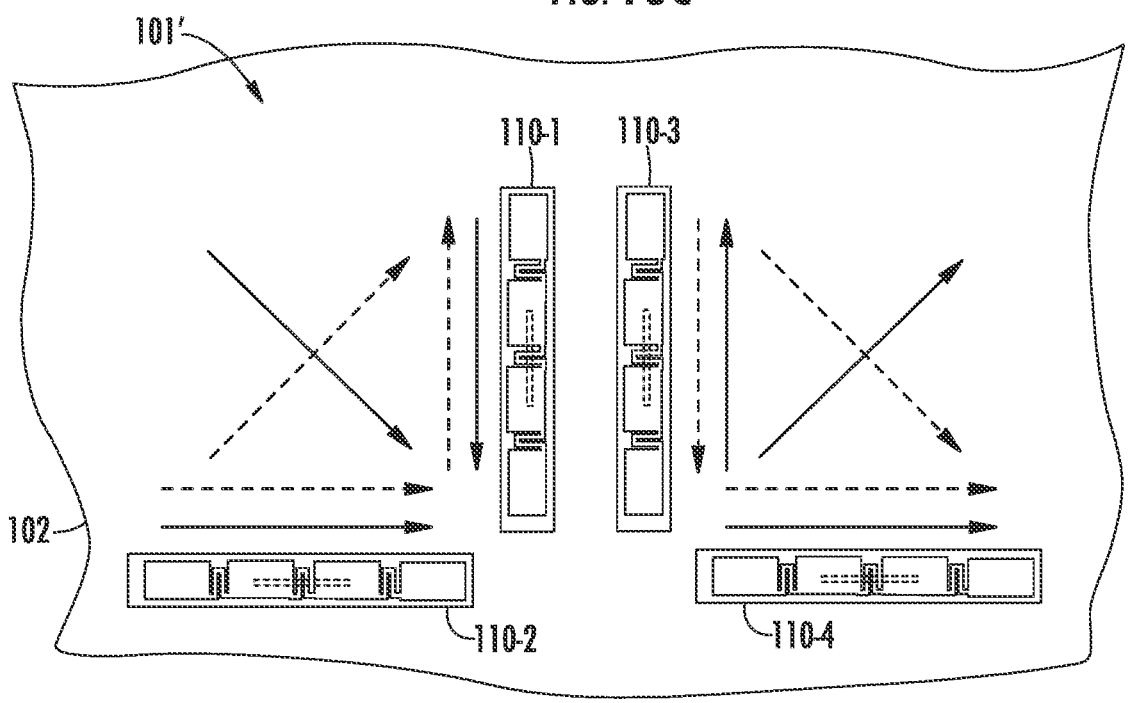

As yet another example, FIG. 16D is a schematic front view of a shared radiating element 101' that again includes the four dipole radiators 110-1 through 110-4 that are mounted on feed stalks to extend forwardly from a reflector 102 of a base station antenna. While each dipole radiator 110 has the same design as the dipole radiators 110 of the box radiating element 100 of FIG. 5D, it will be appreciated that any appropriate dipole radiator design may be used. As shown in FIG. 16D, the dipole radiators 110 may alternatively be arranged as back-to-back "L-shaped structures, with dipole radiators 110-1 and 110-2 forming a backwards L and dipole radiators 110-3 and 110-4 forming an L-shape and positioned just to the right of dipole radiators 110-1 and 110-2. The arrows shown in FIG. 16D illustrate how the RF signals input to the dipole radiators 110 may be phased to generate two −45° polarized antenna beams and two +45° polarized antenna beams. The radiating element 101 may be fed by a pair of four-port combiners in the same general fashion as box dipole radiating element 100.

Pursuant to further aspects of the present invention, the dipole radiators 110 in the shared box dipole radiating element 100 (or the radiators in the other shared radiating elements according to embodiments of the present invention) may, in other embodiments, be moved closer or farther away from each other from what is shown in FIGS. 5A-5B and 5D. Spacing the dipole (or other) radiators further apart may be used to further adjust the azimuth beamwidth for the antenna arrays. For example, in the embodiment shown in FIG. 4, hybrid coupler 44a feeds the top and left segments of the shared box dipole radiating element 46, while hybrid coupler 44b feeds the bottom and right segments of the shared box dipole radiating element 46. The hybrids, however, could be reversed so that hybrid coupler 44b feeds the top and left segments of the shared box dipole radiating element 46, while hybrid coupler 44a feeds the bottom and right segments of the shared box dipole radiating element 46. In this case, the dipole radiator on the far side of the antenna is used for each array (i.e., the left-side array in FIG. 4 would use the dipole radiator on the right side of shared radiating element 46 and the right-side array in FIG. 4 would use the dipole radiator on the left side of shared radiating element 46). In such an embodiment, spreading the dipole radiators of the shared radiating element 46 acts to increase the azimuth aperture of the array, thereby narrowing the azimuth beamwidth of the array. Thus, a horizontal spacing between the radiators of the shared radiating element may be selected to achieve a desired azimuth beamwidth.

Figure 6A:
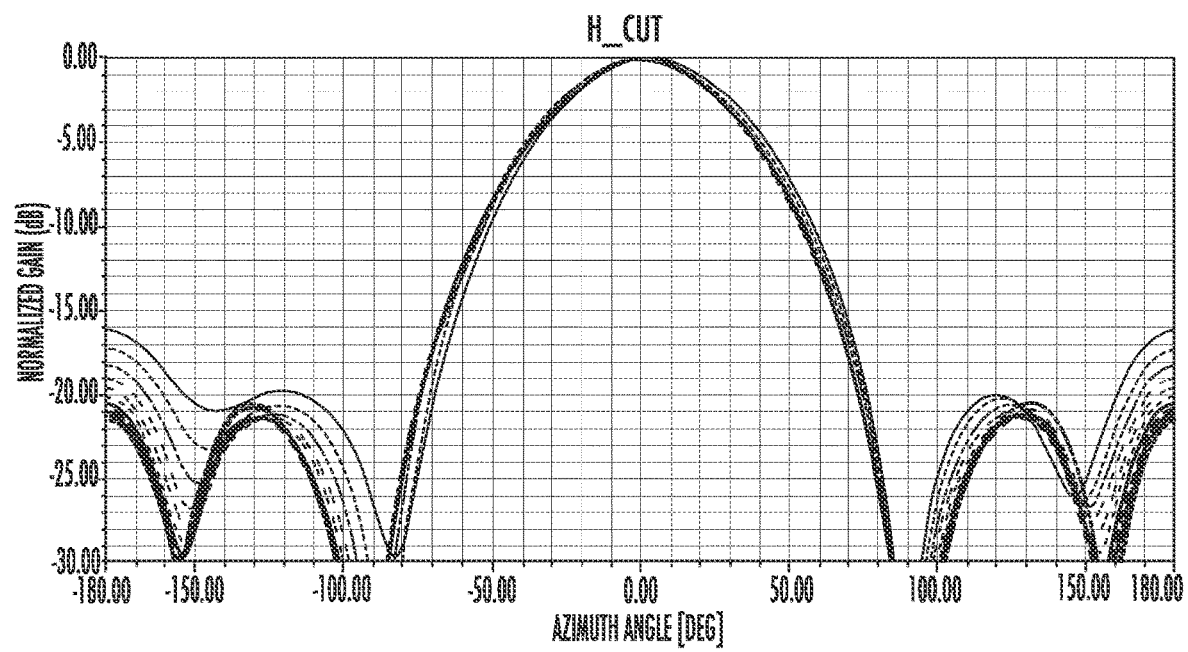
FIGS. 6A and 6B are azimuth and elevation plots of the slant +45° polarization antenna beam formed by the box dipole of FIG. 5A when fed in the manner shown in FIG. 5B super positioned from either (a) the top and left or (b) the right and bottom (dotted line arrows).
Figure 6B:
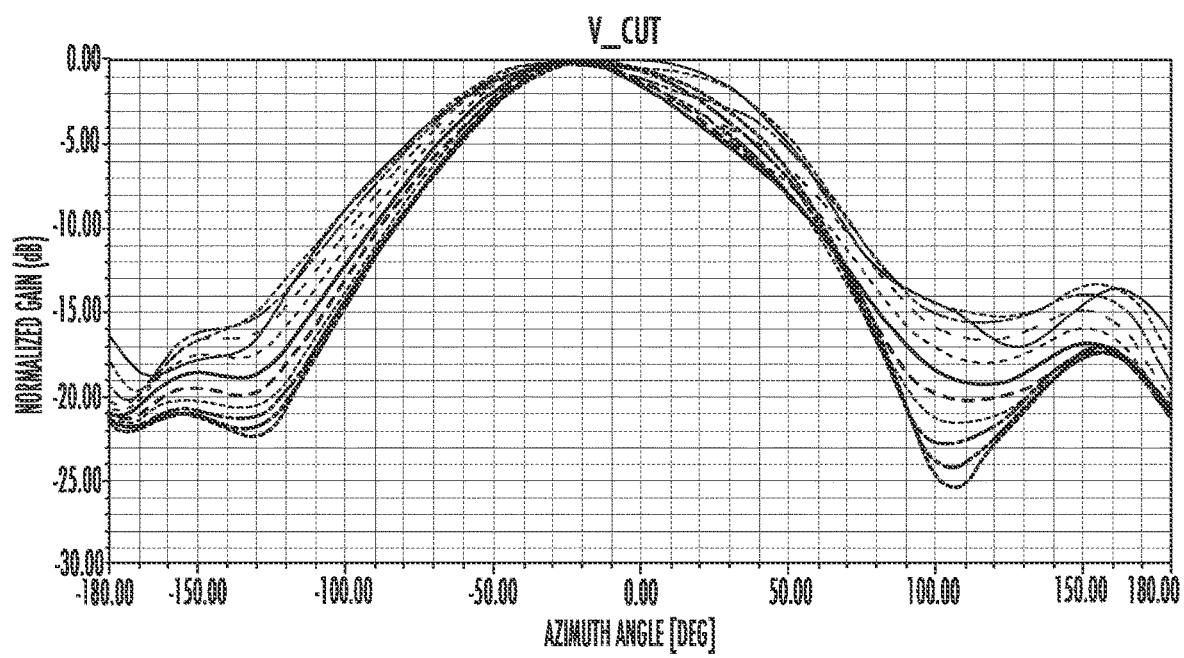

FIGS. 6A and 6B are simulated azimuth and elevation plots of the slant +45° polarization antenna beam formed by the box dipole of FIG. 5A when fed in the manner shown in FIG. 5B. Multiple plots are provided in the graphs of FIGS. 6A and 6B as simulations were performed a variety of different frequencies within the operating frequency band of the shared box dipole radiating element 100. As shown in FIG. 6A, the resultant antenna beam has a symmetrical shape in the azimuth plane, with a half power beamwidth of about 60° which will provide good coverage when the shared box dipole radiating element 100 is used as part of a 120° sector base station antenna. The first sidelobe levels are 20 dB or more below the peak radiation level, which is acceptable performance for a sector base station antenna. The higher radiated energy levels at azimuth angles that are close to 180° off boresight represent backlobe radiation that will reflect off the backplane of the antenna in the forward direction in-phase with the main lobe of the antenna beam.

Referring to FIG. 6B, it can be seen that the radiation pattern is asymmetric in the elevation plane. In particular, the elevation pattern has a downtilt of about 20°, and the pattern is not symmetric about the boresight pointing direction in the elevation plane. Unfortunately, the elevation radiation pattern shown in FIG. 6B would not be considered acceptable for many base station antenna applications.

Figure 7A:
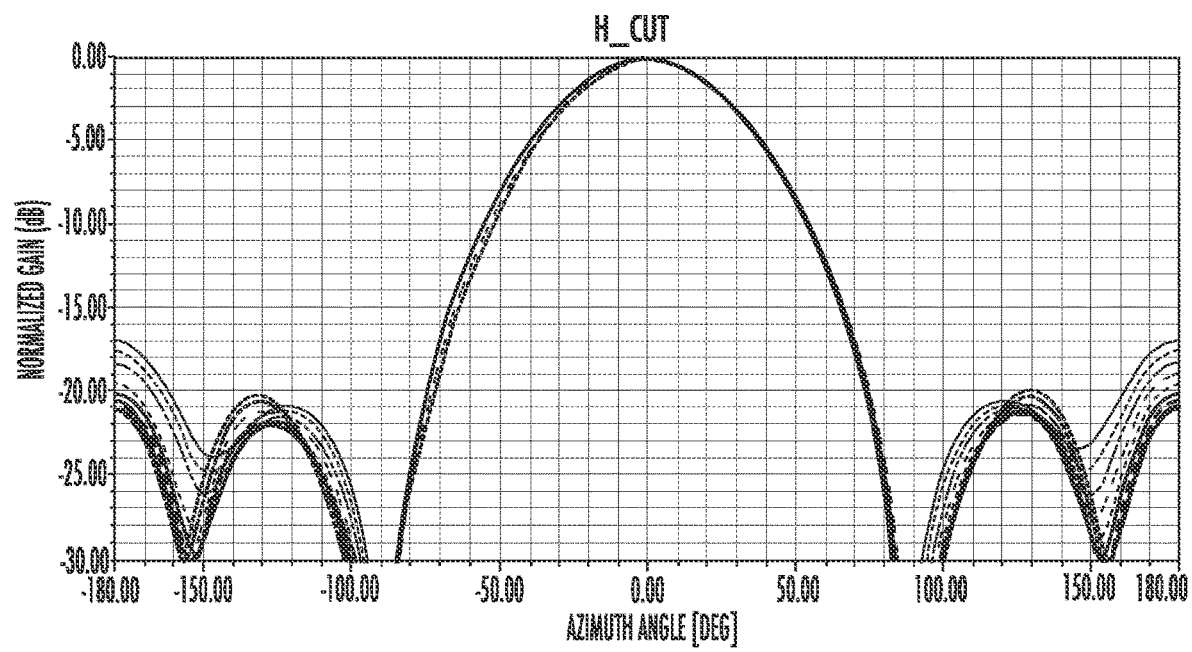
FIGS. 7A and 7B are azimuth and elevation plots of the slant −45° polarization antenna beam formed by the box dipole of FIG. 5A when fed in the manner shown in FIG. 5B super positioned from either (a) the top and left or (b) the right and bottom (solid line arrows).
Figure 7B:
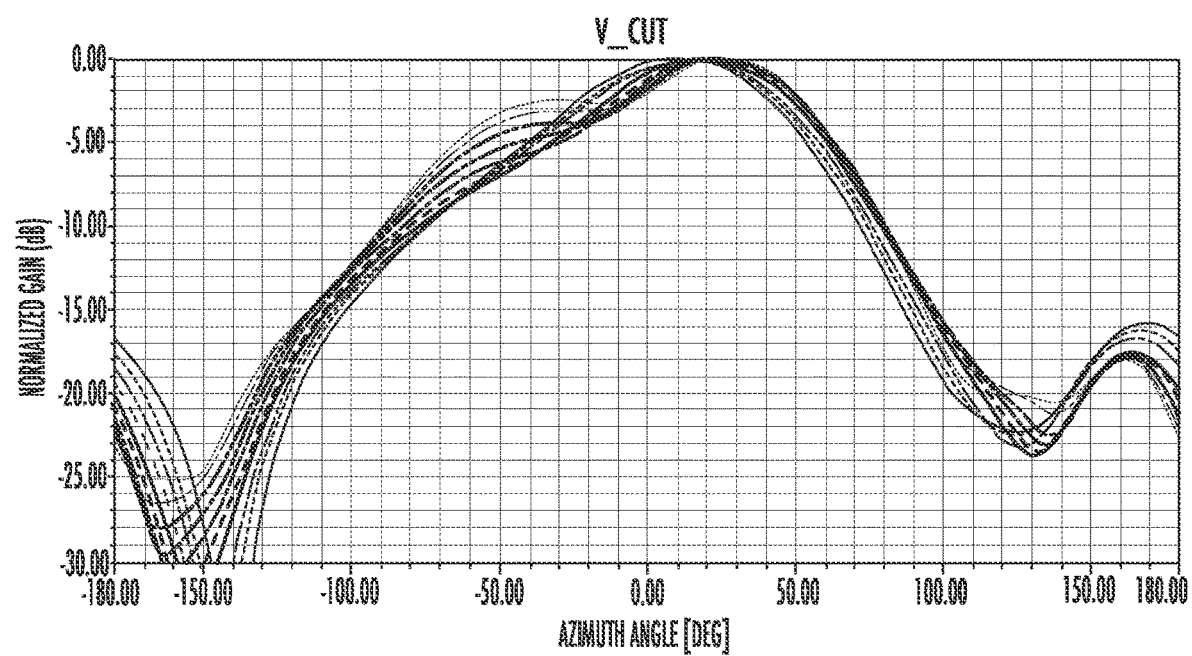

FIGS. 7A and 7B are azimuth and elevation plots of the slant −45° polarization antenna beam formed by the box dipole of FIG. 5A when fed in the manner shown in FIG. 5B. Again, multiple plots are provided in the graphs of FIGS. 7A and 7B as simulations were performed a variety of different frequencies within the operating frequency band of the shared box dipole radiating element 100. The plots of FIGS. 7A and 7B are almost identical to the plots of FIGS. 6A and 6B, except that in FIG. 7B the elevation pattern exhibits an uptilt of about 20° instead of the 20 downtilt shown in FIG. 6B.

Since the elevation patterns shown in FIGS. 6B and 7B are tilted in opposite directions in the elevation plane, one potential technique for increasing the symmetry in the elevation pattern is to include two shared box dipole radiating elements 100-1, 100-2 in the array of FIG. 4, with each shared box dipole radiating element fed in a different manner. This approach will be explained in more detail with reference to FIGS. 8 and 9A-9B.

Figure 8:
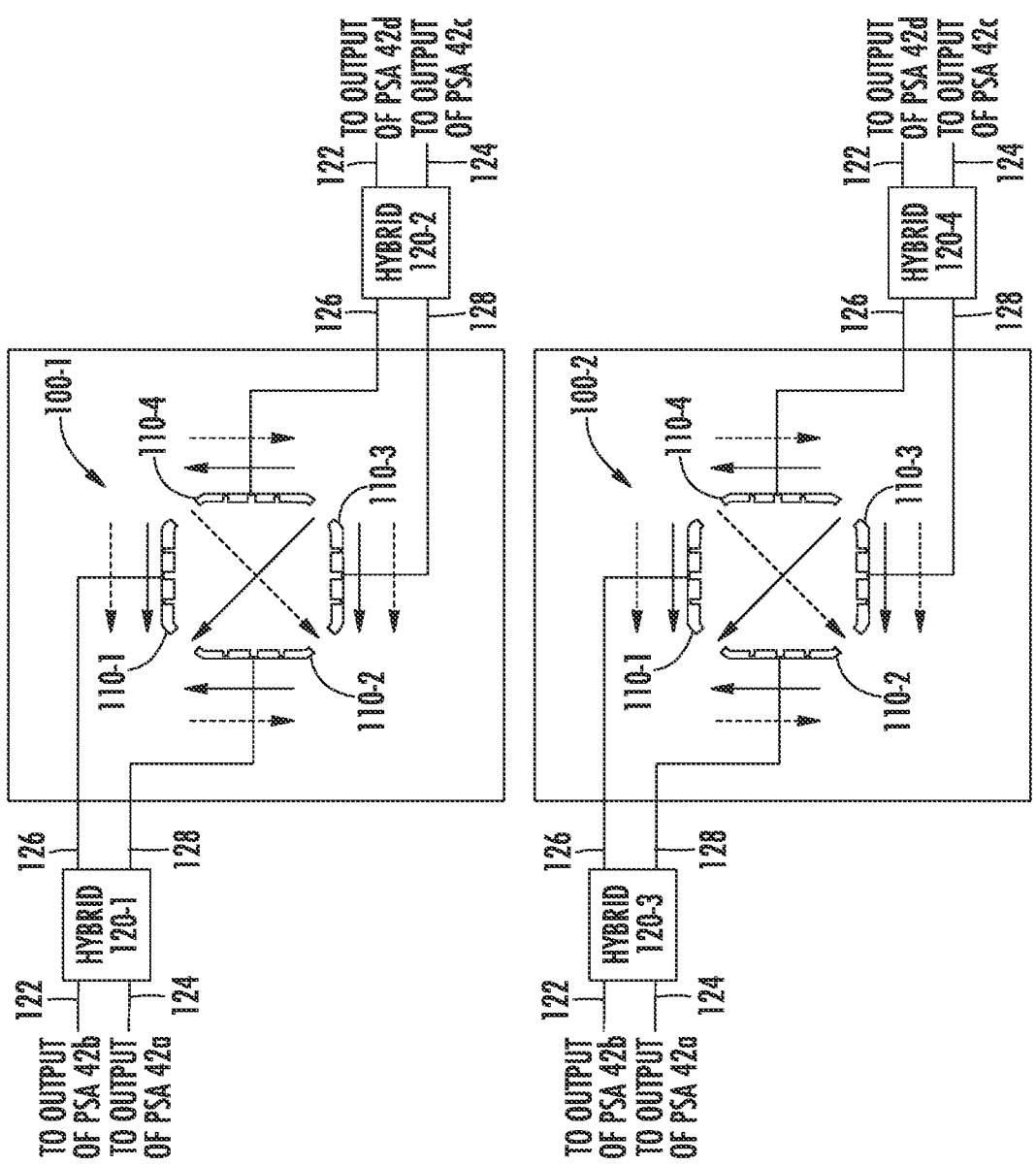
FIG. 8 is a schematic front view of a portion of a base station antenna according to embodiments of the present invention that includes a pair of adjacent shared radiating elements.

FIG. 8 is a schematic front view of a portion of a base station antenna according to embodiments of the present invention that includes a pair of adjacent shared radiating elements 100-1, 100-2. Radiating elements 100-1, 100-2 may be used in place of radiating element 46 in the base station antenna 40 of FIG. 4. FIG. 8 also illustrates how the shared box dipole radiating elements 100-1, 100-2 may be fed so that they will generate antenna beams having improved symmetry.

As shown in FIG. 8, shared box dipole radiating element 100-1 may be fed using a pair of rat race couplers 120-1, 120-2 in the exact same manner that shared box dipole radiating element 100 of FIGS. 5A-5B is fed. Accordingly, further description of the feeding of shared box dipole radiating element 100-1 will be omitted.

Shared box dipole radiating element 100-2, however, is fed differently as compared to shared box dipole radiating element 100-1. In particular, dipole radiators 110-1 and 110-2 of shared box dipole radiating element 100-2 are fed so that an RF signal input to port 122 of rat race coupler 120-3 will be split equally and output in-phase at ports 126, 128, and so that an RF signal input to port 124 of rat race coupler 120-3 will be split equally and output out-of-phase at ports 126, 128. Likewise, dipole radiators 110-3 and 110-4 of shared box dipole radiating element 100-2 are fed so that an RF signal input to port 122 of rat race coupler 120-4 will be split equally and output in-phase at ports 126, 128, and so that an RF signal input to port 124 of rat race coupler 120-4 will be split equally and output out-of-phase at ports 126, 128.

Figure 17:
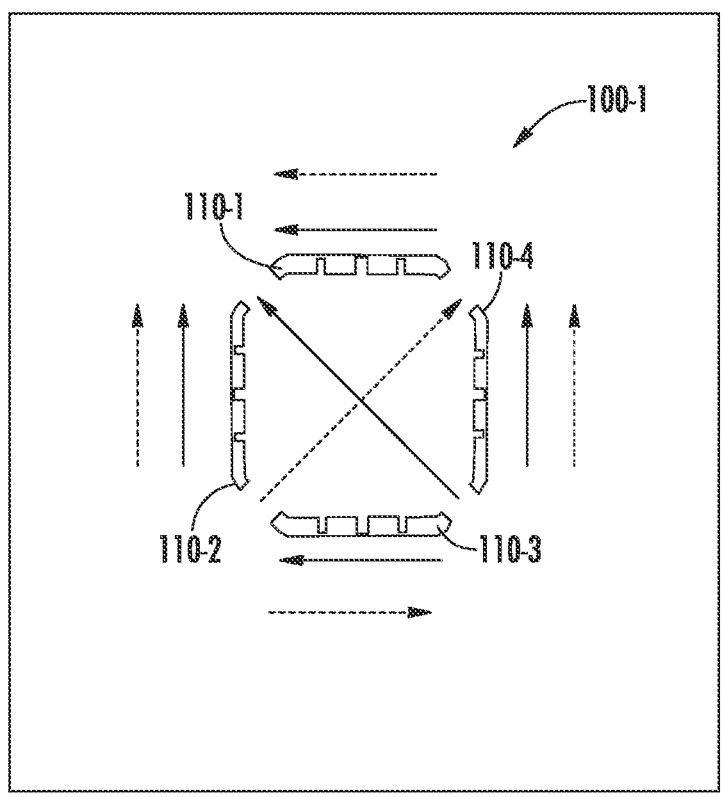
FIG. 17 illustrates an alternative method of feeding the shared box radiating elements of FIG. 8 according to embodiments of the present invention.
Figure 17:
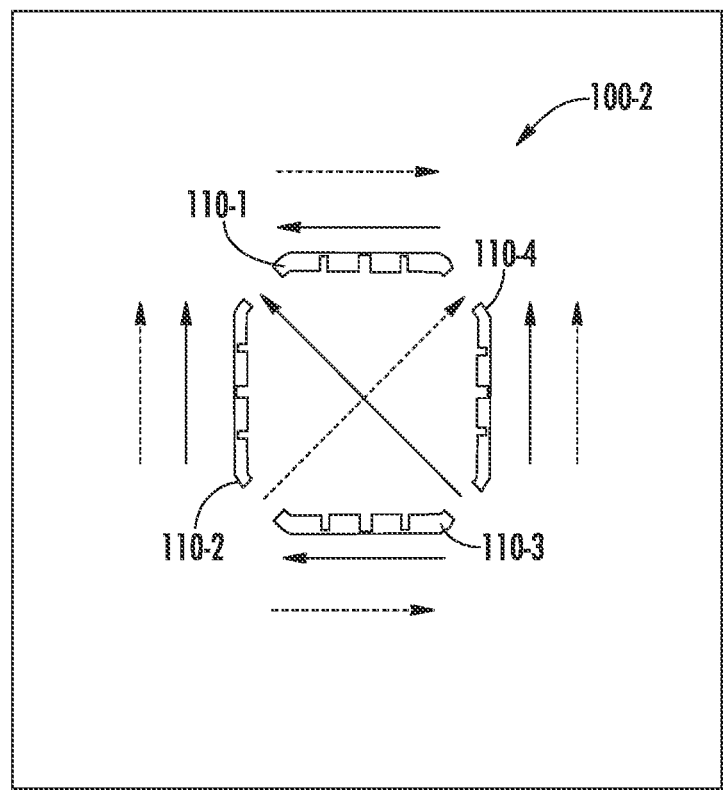

While in the embodiment of FIG. 8 shows one possible way of feeding the dipole radiators of the shared radiating elements 100-1, 100-2 in order to generate the desired 45° and −45° slant polarizations, it will be appreciated that other ways are possible. FIG. 17 shows another example way of feeding the dipole radiators of the shared radiating elements 100-1, 100-2.

Figure 9A:
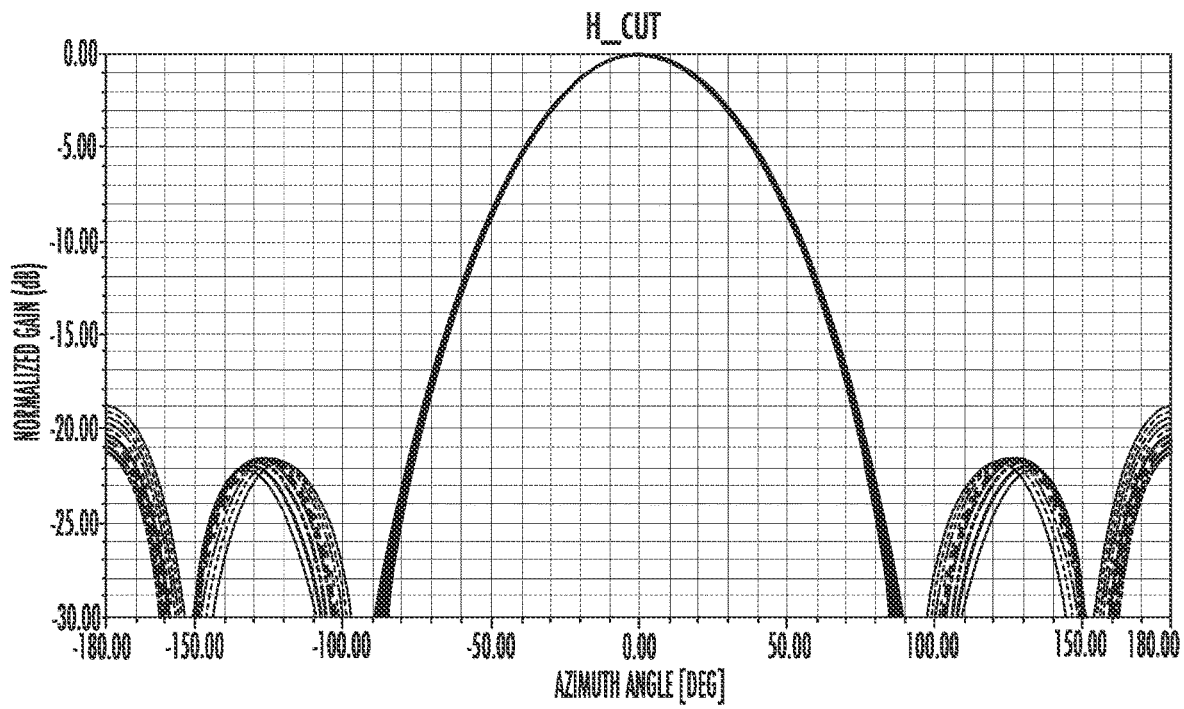
FIGS. 9A and 9B are azimuth and elevation plots of the slant −45° polarization antenna beam formed by the pair of box dipole radiating elements of FIG. 8 when fed in the manner shown in FIG. 8 using either top and left or right and bottom solid line arrows.
Figure 9B:
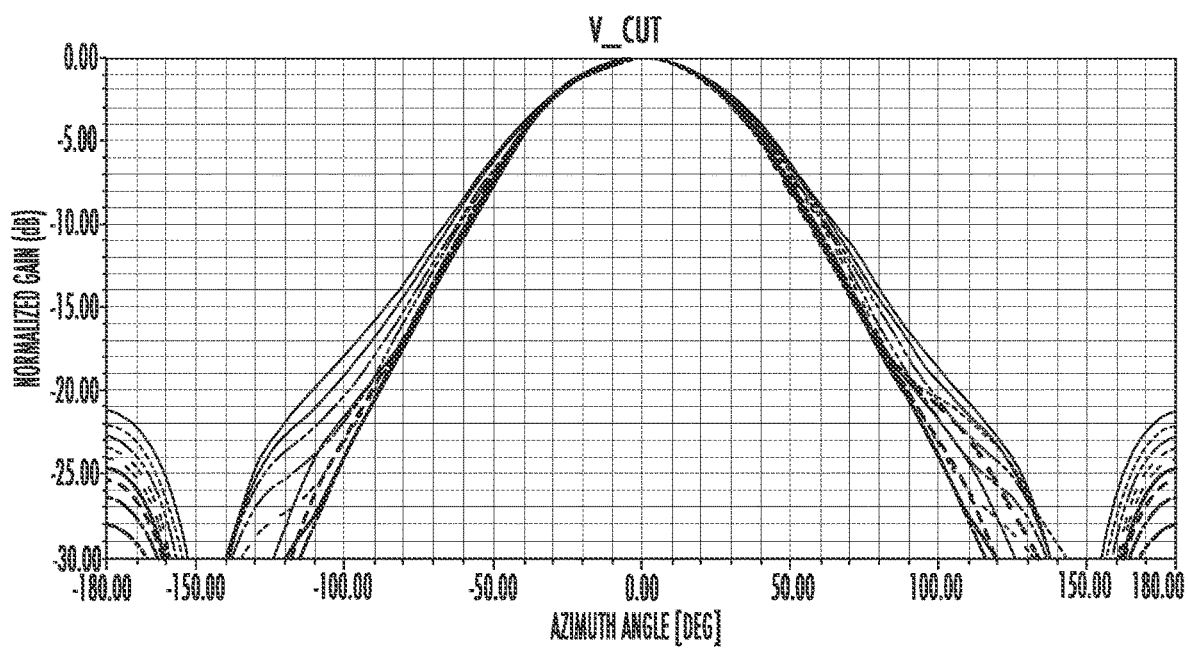

FIGS. 9A and 9B are azimuth and elevation plots of the slant −45° polarization antenna beam formed by the pair of box dipole radiating elements 100-1, 100-2 of FIG. 8 when fed in the manner shown in FIG. 8. As shown in FIGS. 9A and 9B, both the azimuth and elevation patterns of the combined emission of the two shared box dipole radiating elements 100-1, 100-2 are generally symmetrical, and the boresight pointing direction of the elevation pattern is aimed at the horizon. In other words, the tilt in the elevation pattern seen in FIGS. 6B and 7B is largely eliminated. The shared box dipole radiating elements 100-1, 100-2 may be positioned, for example, with one at the top of the base station antenna and one at the bottom of the base station antenna (e.g., in the positions of the shared radiating elements shown in FIG. 2C) in some embodiments. In other embodiments, the shared box dipole radiating elements 100-1, 100-2 may both be positioned, for example, at the top of the base station antenna or at the bottom of the base station antenna.

While the use of two shared box dipole radiating elements 100-1, 100-2 as illustrated in FIG. 8 may improve performance in some applications, it will be appreciated that a single shared box dipole radiating element (or other type of shared radiating element) may be acceptable, or even preferred, in many applications. In particular, if a larger number of non-shared radiating elements are included in an array, then the impact of the above-described up-tilt or down-tilt that the shared radiating array may have on the shape of the antenna beam may be reduced. Moreover, the impact that the shared radiating element may have on the overall characteristics of the antenna beam is also a function of the power fed to each radiating element in the array, and, as discussed above, the shared radiating element often receives a relatively small amount of power compared to other radiating elements in the array. Moreover, additional phase tuning may also be employed to further reduce the impact of the above-described up-tilt or down-tilt that the shared radiating array may have on the shape of the antenna beam. Tus, it will be appreciated that in many cases a single shared box dipole radiating element may be used with little or no negative impact on the antenna pattern.

Figures 10A, 10B, 10C:
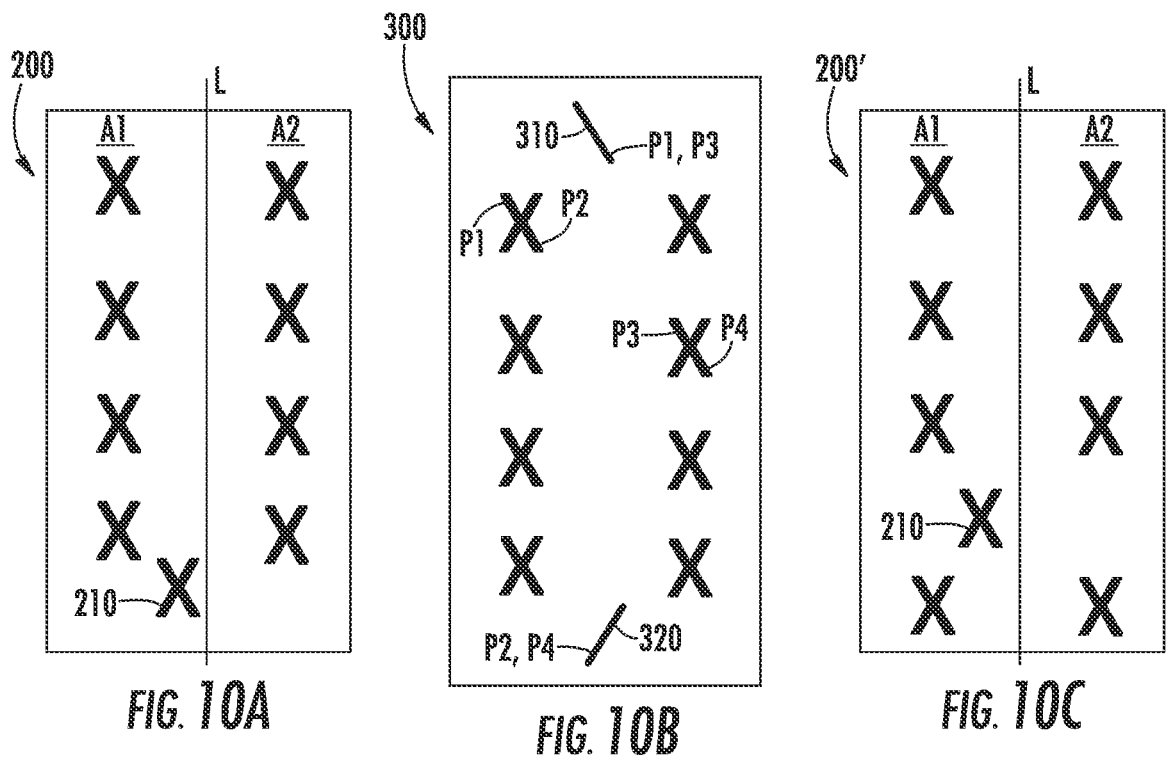
FIG. 10A is a schematic block diagram of a base station antenna according to still further embodiments of the present invention that includes a shared radiating element that is offset from a longitudinal axis that extends halfway between first and second arrays.
FIG. 10B is a schematic block diagram of a base station antenna according to further embodiments of the present invention that includes a shared radiating element that is implemented using two single polarization radiating elements.
FIG. 10C is a schematic block diagram of a modified version of the base station antenna of FIG. 10A.

It will be appreciated that numerous changes may be made to the above described base station antennas without departing from the scope of the present invention. FIGS. 10A-10C illustrate several exemplary changes.

In particular, FIG. 10A is a schematic block diagram of a base station antenna 200 according to still further embodiments of the present invention that includes a shared radiating element 210 that is offset from a longitudinal axis L that extends halfway between first and second arrays A1, A2. The base station antenna 200 may be identical to the base station antenna 20' of FIG. 2B, except that the shared radiating element 210 is positioned closer to array A1 than it is to array A2. It will be appreciated that the modification shown in FIG. 10A may be made to any of the base station antennas according to embodiments of the present invention. It will also be appreciated that, in many applications, performance may be optimized by positioning the shared radiating element on a longitudinal axis that extends midway between the longitudinal axes defined by the first and second arrays.

FIG. 10B is a schematic block diagram of a base station antenna 300 according to further embodiments of the present invention that includes a shared radiating element that is implemented using two shared single polarization radiating elements as opposed to a single cross-polarized radiating element. In the embodiment of FIG. 10B, shared single polarization radiating elements 310, 320 are implemented as dipoles, with dipole 310 located at the top of the antenna 300 and dipole 320 located at the bottom of antenna 300. Base station antenna may be viewed as being substantially functionally equivalent to the base station antenna 20' of FIG. 2B, except that half of the shared radiating element of FIG. 2B is moved to the top of the antenna 300. As can be seen from FIGS. 2B and 10B, dipole 310 receives an RF signal that is a combination of a sub-component of the signal input at FEED1 and a sub-component of the signal input at FEED3, while dipole 320 receives an RF signal that is a combination of a sub-component of the signal input at FEED2 and a sub-component of the signal input at FEED4.

FIG. 10C is a schematic block diagram of a base station antenna 200' that is a modified version of the base station antenna of FIG. 10A. As shown in FIG. 10C, the only difference between the base station antenna 200 and the base station antenna 200' is the location of the shared radiating element 210, which is moved into a central position in the antenna in base station antenna 200' as opposed to being at one of the ends of the arrays A1, A2 as is the case in base station antenna 200.

As yet another example, FIGS. 5A-9B illustrate example embodiments of the present invention that use one or more box dipole radiating elements as shared radiating elements. In other embodiments, circular (loop) dipoles may alternatively be used that, for example, include 4 segments that each extend through an arc of about 90° that are positioned to generally define a circle.

In the above described embodiments, the shared radiating element(s) are positioned at either or both the bottom of the antenna and/or the top of the antenna so that they are the top and/or bottom radiating elements of each array. This arrangement may be particularly advantageous in embodiments of the present invention that use Wilkinson power couplers or other devices that terminate some of the RF energy as opposed to radiating such energy. When a portion of each RF signal is terminated in this manner, it represents lost energy which reduces the gain of the antenna. Typically, in order to shape the radiation pattern of a base station antenna in the elevation plane, an amplitude taper is applied to the sub-components of the radiating elements in each array so that the radiating elements in the middle of each array receive sub-components of the RF signals having the highest magnitude, while the radiating elements on either end of each array receive sub-components of the RF signals having the lowest magnitude. Such an amplitude taper is shown, for example, in FIG. 2C above, where the middle radiating elements of each array receive sub-components of RF signals having a relative magnitude of 0.26, the radiating elements of each array that are adjacent the middle radiating elements of each array receive sub-components of RF signals having a relative magnitude of 0.23, and the shared radiating elements that are at the top and bottom of the arrays receive sub-components of RF signals having a relative magnitude of 0.14. As is further shown in FIG. 2C, when passing through the couplers 26a'-26d', each RF signal fed thereto is split in half (i.e., the relative magnitudes of the RF signals are reduced to 0.07 each) due to the termination of energy within the couplers 26a'-26d'. Consequently, each shared radiating element terminates 7% of each RF input signal, and hence a total of 14% of each RF input signal is lost in the base station antenna 20" of FIG. 2C due to the use of the shared radiating elements. If the shared radiating elements were instead located at more interior positions within the antenna then, due to the amplitude taper, higher power signals would be fed to the shared radiating elements, and the amount of power loss would increase accordingly. Thus, in many applications, it may be advantageous to locate the shared radiating elements at the top and/or bottom of the arrays.

Figure 11:
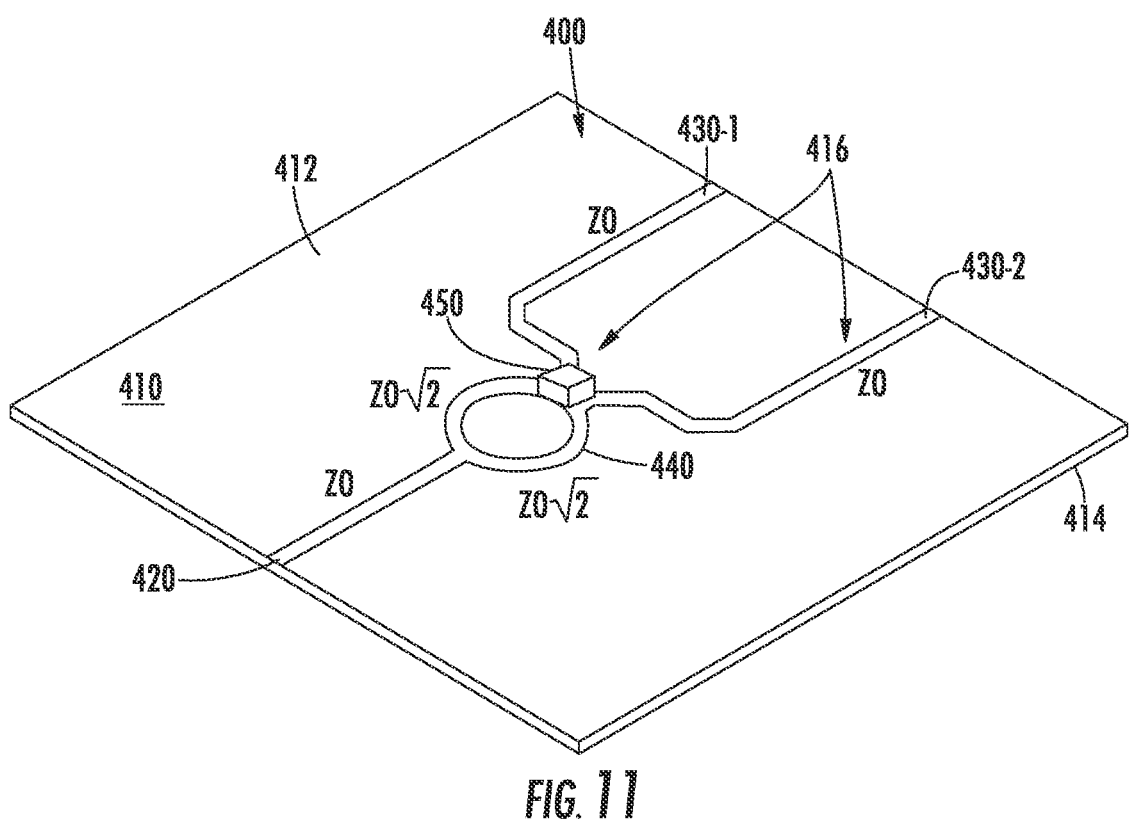
FIG. 11 is a schematic diagram of a Wilkinson power coupler that may be used, for example to implement the power couplers included in the base station antennas of FIGS. 2A-2C.

FIG. 11 is a schematic diagram of a Wilkinson power coupler 400 that may be used, for example to implement the power couplers 26a-26d in FIG. 2A and 26a'-26d' in FIGS. 2B-2C. FIG. 11 makes clear the manner in which a Wilkinson power divider may terminate (and hence lose) a portion of the RF signals that are to be transmitted by the base station antennas according to embodiments of the invention.

As shown in FIG. 11, the Wilkinson power coupler 400 may be implemented on a printed circuit board 410 that includes a dielectric substrate 412, a conductive ground plane 414 on a lower surface of the dielectric substrate 412 and a conductive pattern 416 on an upper surface of the dielectric substrate 412. The Wilkinson power coupler 400 includes an output port 420, first and second input ports 430-1, 430-2, coupling transmission lines 440 and a surface mount resistor 450 that is coupled between the two coupling transmission lines 440. The coupling transmission lines 440 may have a narrower width so that the transmission lines connected to the input and output ports have a characteristic impedance of Z0, while the coupling transmission lines 440 have a characteristic impedance of Z0√2. As such, each coupling transmission line 440 acts as a quarter wavelength transformer. By selecting a proper resistance value for the resistor 450 a high degree of isolation may be maintained between the first and second input ports 430-1, 430-2, which is necessary to maintain isolation between the two arrays. The Wilkinson power coupler 400 of FIG. 11 may combine two RF signals that are input at input ports 430-1, 430-2 and provide the combined signal to output port 420, but half of the energy of each input signal is terminated into the resistor 450 where these signals are dissipated as heat.

While power loss is one potential disadvantage that results from the use of Wilkinson power couplers, the use of Wilkinson power couplers or other resistor-terminated devices may raise additional issues in some applications. For example, in some applications, the RF signals may be relatively high power signals having peak powers of 200 Watts, 300 Watts or more. If 300 Watt RF signals are input at, for example, each feed of the base station antenna 20" of FIG. 2C, a total of 42 Watts of power will be dissipated in the resistor of each Wilkinson power divider (since each resistor will receive 7% of two 300 Watt RF signals). High power resistors that are capable of handling such power levels tend to be expensive and, more importantly, tend to be potential generators of passive intermodulation ("PIM") distortion. Since PIM distortion can severely degrade the performance of a wireless communications system, the use of PIM generating resistors may not be acceptable in many applications. In addition, the amount of heat generated in dissipating such high power signals may also be problematic in certain applications. Thus, in some applications, the use of Wilkinson power couplers or other devices having resistive terminations may not be an acceptable option.

Power couplers 26a-26d and 26a'-26d' are used in the base station antennas of FIGS. 2A-2C because those antennas use cross-dipole shared radiating elements that only have two inputs (namely each dipole of the cross-dipole radiating element receives an RF signal), As discussed above with reference to FIGS. 3A-9B, in other embodiments, the shared radiating elements may have four input ports. In such embodiments, 4 port couplers such as the above-referenced rat race couplers 120 may be used to combine RF signals that are fed to the shared radiating elements, and four combined signals may be fed to the four input ports of each shared radiating element. Typically, the four-port couplers do not include an isolation resistor and hence avoid the power loss, heat generation and PIM distortion issues that may be present when Wilkinson or other three port power couplers are used.

While the use of four-port hybrid couplers may avoid some issues, four-port hybrid couplers tend to be expensive. Pursuant to still further embodiments of the present invention, base station antennas are provided that have shared radiating elements that are fed by three-port power couplers that use lossy elements and/or radiating elements in place of a resistive termination. The use of such shared radiating elements may avoid the need for high-power resistors and the above-discussed heat and PIM distortion issues that may be associated with the use of such high-power resistors, and may reduce or even eliminate the power loss associated with the use of resistive terminations.

Figure 12A:
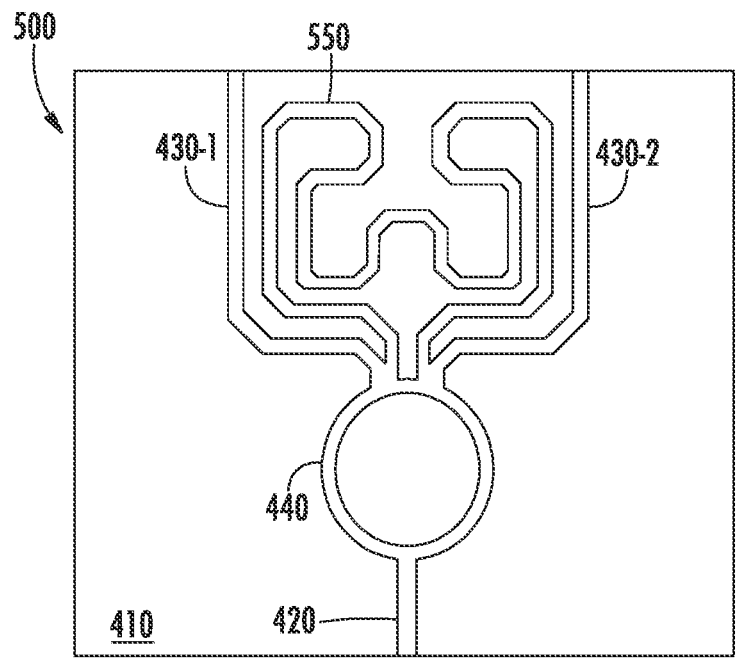
FIGS. 12A and 12B are schematic views of power couplers according to embodiments of the present invention that use non-resistive lossy elements to provide isolation between the inputs thereof.
Figure 12B:
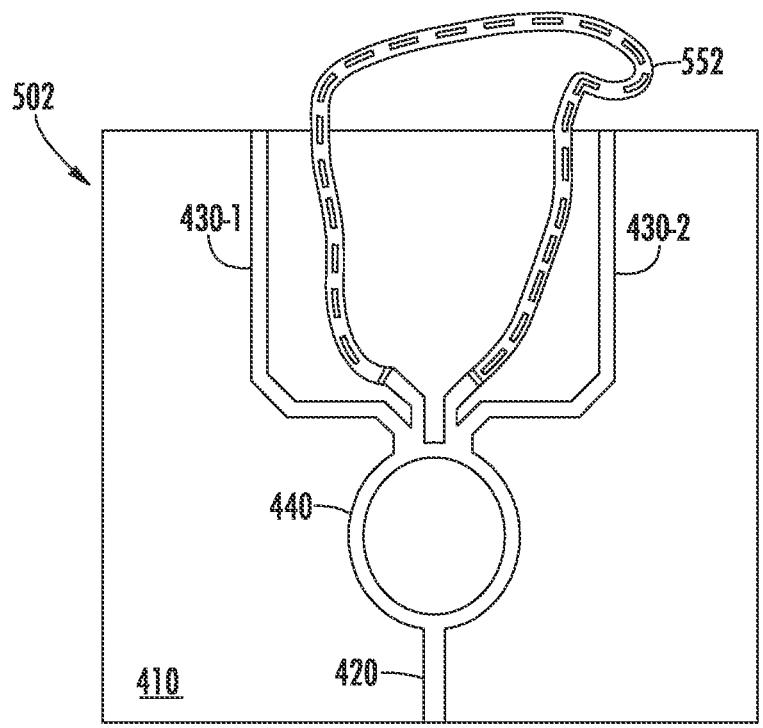

In some embodiments, the resistor 450 included in each Wilkinson power coupler (see FIG. 11) may be replaced with a different lossy element. For example, as shown in FIG. 12A, power couplers 500 may be used that have the design of a Wilkinson power coupler but include a meandering microstrip transmission line 550 in place of the resistor 450 included in the conventional Wilkinson power coupler 400 of FIG. 11. At the wireless frequencies used in cellular communications, unshielded RF transmission line segments (such as microstrip transmission lines) tend to radiate energy, and hence a sufficiently long microstrip transmission line will radiate much of the RF energy and hence provide sufficient isolation between the input ports 430-1, 430-2 of the power coupler 500. As shown in FIG. 12B, in other embodiments, power couplers 502 are provided in which the meandering microstrip transmission line 550 of power coupler 500 is replaced with a leaky coaxial cable 552 that operates in a similar manner. The power couplers 500 and 502 of FIGS. 12A-12B may thus avoid the need for the use of a high-power resistor and the associated PIM distortion issues that may be associated therewith. While FIGS. 12A and 12B provide two examples of lossy elements that may be used in place of the resistors included in isolated Wilkinson power couplers, it will be appreciated that a wide variety of other lossy elements may be used. As another example, the isolation paths in the Wilkinson power coupler could be coupled to the inputs of a 90° hybrid coupler, and the outputs of the 90° hybrid coupler could be coupled to each other (e.g., run side-by-side in order to heavily couple with each other) in a coupling section. After this coupling section, each output could be terminated into a respective resistor. Since the outputs carry equal but opposite signals, the RF energy travelling through the outputs will partially cancel out in the coupling section, reducing the magnitude of the RF signals on the outputs so that smaller, cheaper resistors may be used that may now have PIM and/or cost issues. It will also be appreciated that the power couplers need not have a Wilkinson power coupler design.

According to further embodiments of the present invention, the resistors included in conventional Wilkinson power couplers could be replaced with one or more radiating elements that are used to radiate, rather then terminate, the RF energy on the isolation path in the Wilkinson power coupler. Such an arrangement may be particularly advantageous in some applications because it not only avoids the various issues associated with the use of high-power resistors, but also may reduce or even eliminate the power loss associated with the use of isolated Wilkinson power couplers. The radiating elements used may be structures that are already present in the antenna or, alternatively, may be additional radiating elements.

Figure 13A:
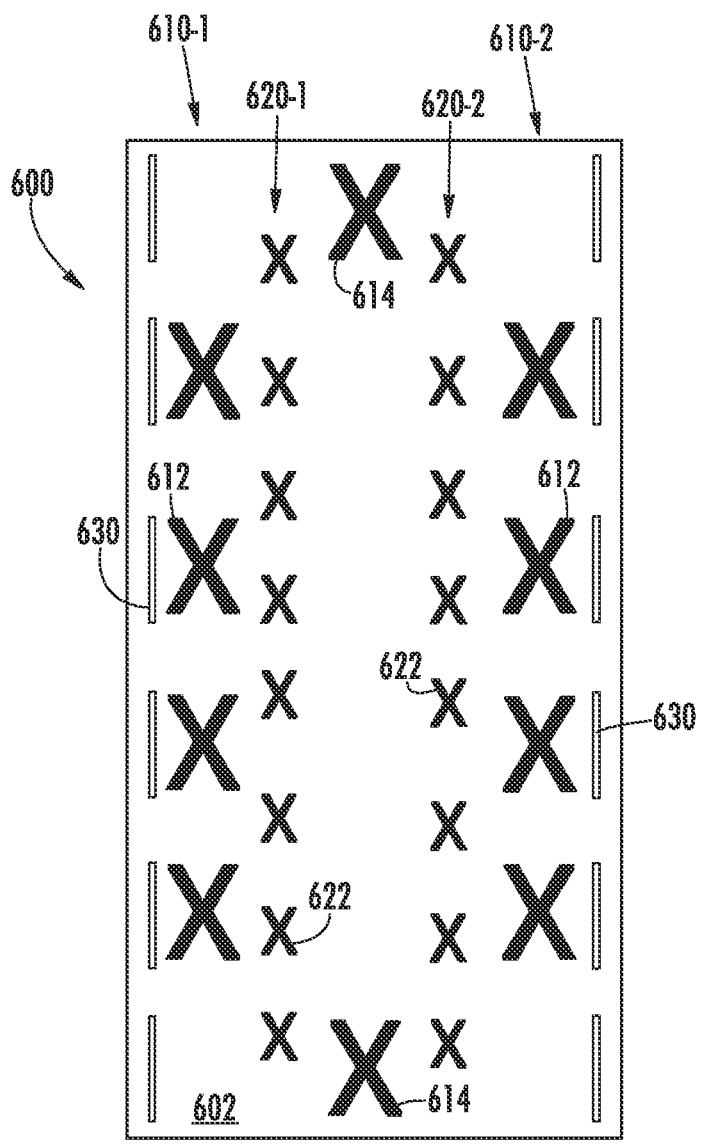
FIG. 13A is a schematic diagram illustrating a multi-column base station antenna according to embodiments of the present invention that includes parasitic elements that help shape the low-band antenna beams.
Figure 13B:
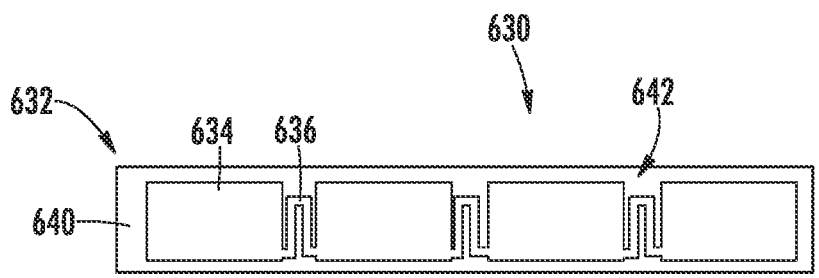
FIG. 13B is a side view of one of the parasitic elements included in the antenna of FIG. 13A.
Figure 13C:
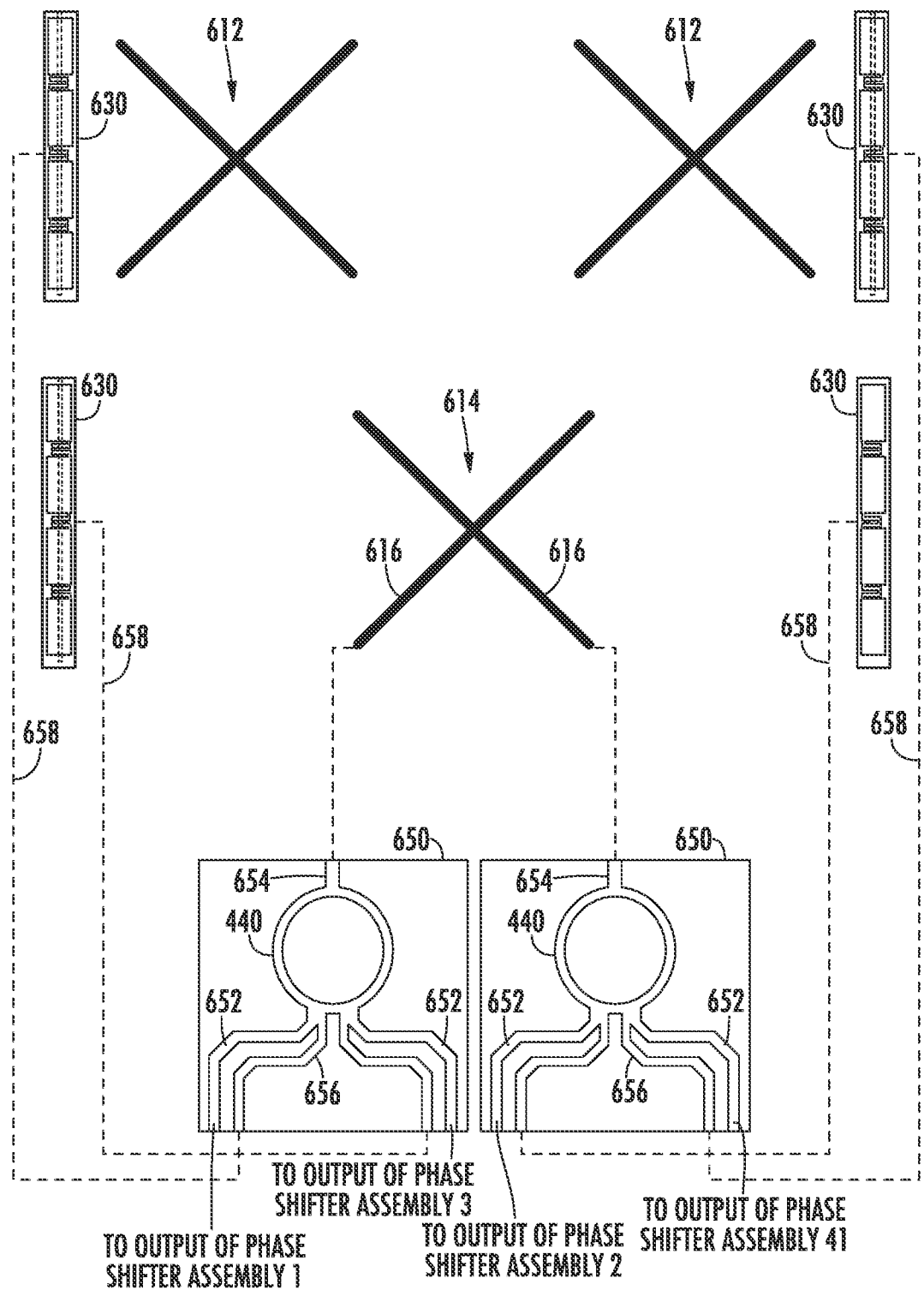
FIG. 13C is a schematic diagram illustrating how the isolation paths on each Wilkinson power divider may be coupled to parasitic elements instead of to a resistor pursuant to embodiments of the present invention.

FIGS. 13A-13C illustrate one such embodiment of the present invention in which parasitic elements that are already present in an antenna design may be used as "terminations" in the Wilkinson power couplers in place of the resistors 450. In particular, FIG. 13A is a schematic diagram illustrating a multi-column dual-band base station antenna 600 that includes both shared radiating elements as well as parasitic elements 630 that help shape the low-band antenna beams. FIG. 13B is a side view of one of the parasitic elements included in the base station antenna of FIG. 13A. Finally, FIG. 13C is a schematic diagram illustrating how the isolation paths on each Wilkinson power coupler may be coupled to parasitic elements instead of to a resistor pursuant to embodiments of the present invention.

Referring first to FIG. 13A, the base station antenna 600 may include two low-band arrays 610-1, 610-2 of radiating elements and two high-band arrays 620-1, 620-2 of radiating elements. Each low-band array 610 includes a column of cross-dipole low-band radiating elements 612, and each high-band array 620 includes a column of cross-dipole high-band radiating elements 622. Each low-band array 610 further includes a pair of shared cross-dipole low-band radiating elements 614 that part of each low-band array 610. The shared low-band radiating elements 614 are positioned between the two columns of cross-dipole low-band radiating elements 612, with both of the shared low-band radiating elements 614 being positioned at the top and bottom of the antenna 600, respectively, in the depicted embodiment.

As is further shown in FIG. 13A, a plurality of parasitic elements 630 are included along the side edges of base station antenna 600 that are used to shape the low-band antenna beams. FIG. 13B is a side view of one of the parasitic elements 630. As shown in FIG. 13B, each parasitic element 630 may comprise a dipole 632 having an electrical length of, for example, between one-quarter and one-half the wavelength corresponding to the center frequency of the operating frequency band for the low-band radiating elements 612 and/or 614. The dipole 632 may comprise a plurality of widened conductive segments 634 that are electrically connected in series by a plurality of narrow conductive segments 636. As explained above with reference to the dipole radiators 110 of the shared box dipole radiating element 100 of FIGS. 5A-5B, by appropriately sizing the widened conductive segments 634 and the narrow conductive segments 636, the dipole 632 may be made to be substantially transparent to RF energy radiated by the high-band radiating elements 622. The parasitic elements 630 may be implemented as a conductive metal pattern 642 on a printed circuit board substrate 640. As can best be seen in FIG. 13A, in some embodiments, the printed circuit board substrate 640 may be mounted so that the major surface thereof is generally perpendicular to a reflector 602 of the base station antenna 600.

The shared radiating elements 614 may be fed by four power couplers 650 in the manner shown in FIG. 2C. However, instead of using isolated Wilkinson power couplers or other conventional power couplers, each power coupler 650 may be coupled to a pair of the parasitic elements 630 that are used to radiate RF energy present on the isolation branches of the power couplers 650. This is shown in FIG. 13C, which is a schematic block diagram illustrating two power couplers 650 according to embodiments of the present invention that are used to feed one of the shared low-band radiating elements 614, as well as the parasitic elements 630 that are coupled to the power coupler 650. FIG. 13C may be viewed as illustrating the bottom portion of the base station antenna 600 as shown in FIG. 13A, with the high-band radiating elements 622 omitted to allow enlargement of the depicted elements of the antenna.

As shown in FIG. 13C, each power coupler 650 includes first and second input ports 652 that are coupled to respective outputs of four phase shifter assemblies (not shown) in the manner discussed above with reference to FIGS. 2A-2C. Each power coupler 650 further includes an output port 654 that is coupled to a respective one of the dipole radiators 616 of shared low-band radiating element 614. As was discussed above with reference to FIG. 11, in a conventional isolated Wilkinson power coupler 400, RF energy that is fed into the power coupler 400 at an input port 430 is split into two equal components, with half of the RF energy flowing to the output port 420 and the other half being terminated along an isolation path into the resistor 450. In power couplers 650, the resistor 450 is omitted, and instead each isolation path 656 is instead coupled via an RF transmission line to a respective parasitic element 630. Since each input port 652 is coupled to a parasitic element 630, and since two power couplers 650 are used to feed each shared low-band radiating element 614, a total of four parasitic elements 630 may be included along the feed network for each shared low-band radiating element 614.

When an RF signal is input, for example, to one of the input ports 652 of power coupler 650, it is split in two at the junction of the coupling transmission line 440 and the isolation path 656. The portion of the RF signal flowing through the isolation path 656 passes along an RF transmission path 658 (the RF transmission lines 658 are shown schematically in FIG. 13C as dotted lines to simplify the drawing, and may be implemented using, for example, coaxial cables) to one of the parasitic elements 630, where the RF energy is radiated into free space. As the parasitic elements 630 are located on the front of the reflector 602, the RF energy radiated by the parasitic elements 630 is effectively added to the RF energy emitted by the low-band array 610, particularly if care is taken to make sure that the parasitic elements 630 radiate in phase with the remainder of the low-band array 610. Thus, the base station antenna 600 not only eliminates the resistors 450 that are present in conventional Wilkinson power dividers, but it also avoids the power loss associated with terminating the stubs 656 into a termination element.

In the embodiment of FIG. 13C, a parasitic element 630 is provided adjacent each low-band radiating element 612 and a parasitic element 630 is provided on each side of each shared low-band radiating element 614. Since only two parasitic elements 630 are provided adjacent each shared low-band radiating element 614, the first isolation path on each power coupler 650 is coupled to a respective one of two parasitic elements 630 that are adjacent the shared low-band radiating element 614 and the second isolation path on each power coupler 650 is coupled to a respective one of the parasitic elements 630 that is adjacent the two low-band radiating elements 612 that are closest to the shared low-band radiating element 614, as can be seen in FIG. 13C. In some applications, such an arrangement may negatively impact the amplitude taper applied across the radiating elements 612 in each low-band array 610. Thus, according to further embodiments of the present invention, alternative parasitic elements designs and arrangements may be provided that may provide enhanced performance.

Figure 13D:
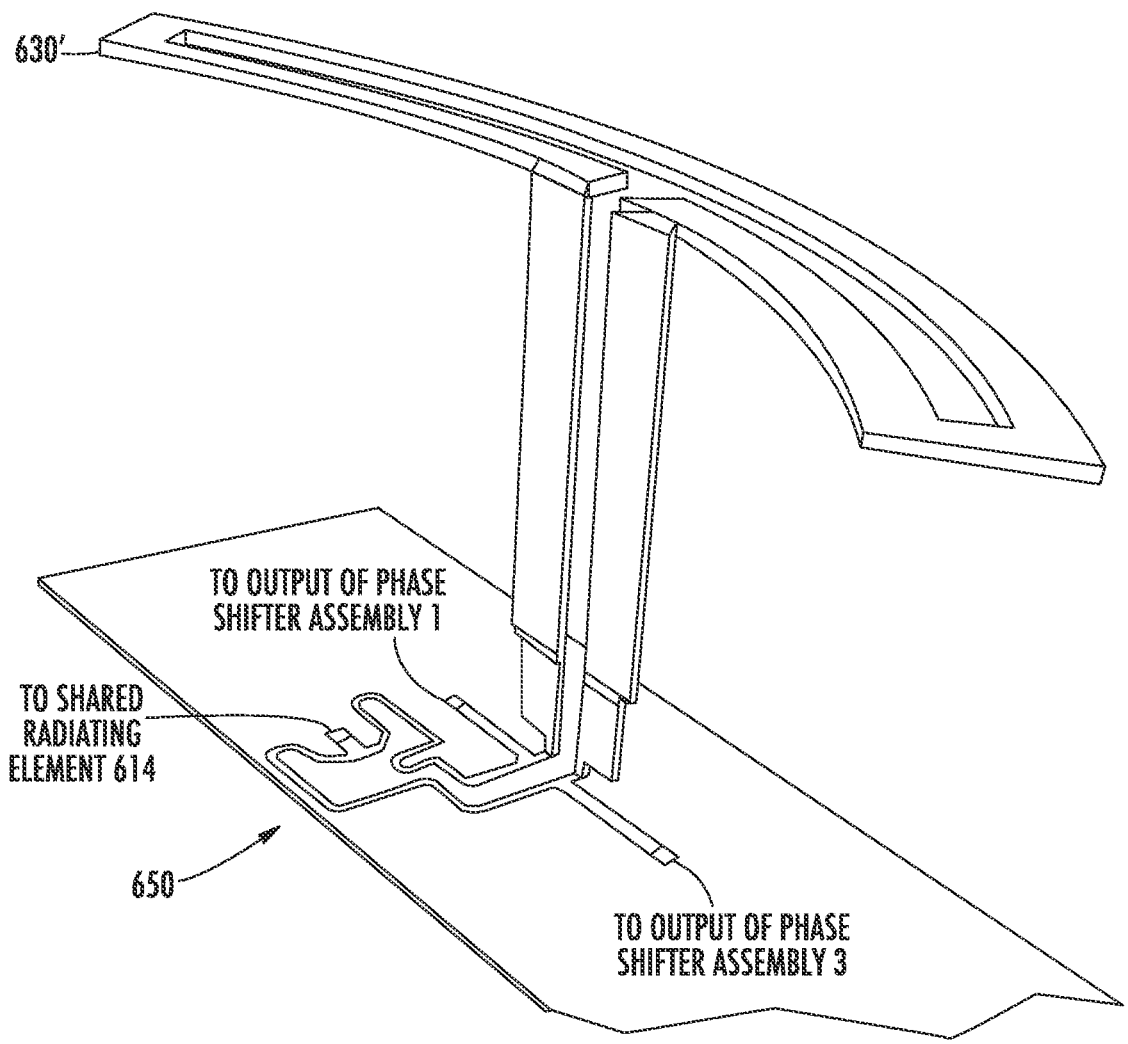
FIG. 13D is a schematic diagram illustrating how a folded dipole radiator may be used as a parasitic element instead of the cloaked dipole radiator parasitic elements shown in FIG. 13C.

While FIGS. 13B and 13C illustrate an example embodiment where the parasitic elements 630 are implemented using so-called "cloaked" dipoles 632 that have an electrical length of, for example, between one-quarter and one-half the wavelength corresponding to the center frequency of the operating frequency band for the low-band radiating elements 612 and/or 614, it will be appreciated that embodiments of the present invention are not limited thereto. For example, FIG. 13D illustrates a folded dipole radiator 630' that may be used in place of, for example, a pair of the parasitic elements 630 shown in FIG. 13C. In particular, FIG. 13C illustrates one possible implementation of the lower portion of base station antenna 600 of FIG. 13A. The implementation shown in FIG. 13C loads the two isolation ports 656 of each of the two Wilkinson-style power dividers 650 that are illustrated with a parasitic element 630 in order to radiate the RF energy that is coupled to the isolation ports 656 instead of terminating the RF energy into a resistive termination as would be done if conventional Wilkinson power dividers were used. As shown in FIG. 13D, a single folded dipole radiator 630' may be connected to both isolation ports 656 of the Wilkinson-style power dividers 650, and hence two folded dipole radiators 630' may be used to replace the four parasitic elements 630 shown in FIG. 13C when coupled to the Wilkinson-style power dividers 650 in the manner shown in FIG. 13D. For example, the two parasitic elements 630 shown on the left-hand side of FIG. 13C could be replaced by a first folded dipole radiator 630' and the two parasitic elements 630 shown on the right-hand side of FIG. 13C could be replaced by a second folded dipole radiator 630'. Two additional folded dipole radiators 630' could be used in similar fashion in place of the four parasitic radiators 630 shown in the top-most part of FIG. 13A, and could be fed by two additional power couplers 650 in the manner described with reference to FIG. 13C. FIG. 13D also illustrates an actual implementation of the power coupler 650 as a microstrip Wilkinson power coupler with the resistor replaced by the folded dipole radiator 630'.

It will also be appreciated that the orientation of the parasitic elements 630 or the parasitic folded dipole radiators 630' may be varied from what is shown in FIGS. 13C and 13D. For example, each parasitic element 630 may be rotated 90° (or some other angle) about its vertical axis. As another example, the folded dipole radiators 630' could be oriented to extend outwardly rather than forwardly and strategically placed along the reflector if more horizontal component is needed in the azimuth pattern. Thus, it will be appreciated that the parasitic elements 630 and/or the parasitic folded dipole radiators 630' may be used not only to provide a low-PIM power coupler design, but may also contribute to the total radiated energy and/or be used to shape the antenna beam in desired ways.

Figure 14A:
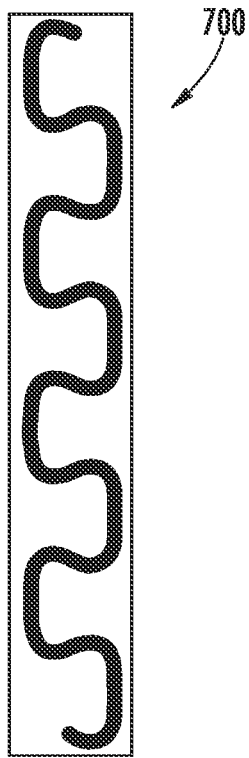
FIG. 14A is a schematic diagram illustrating how meandered dipoles may be used to implement the parasitic elements shown in FIG. 13C.

In particular, FIG. 14A is a schematic diagram illustrating how meandered vertical dipoles 700 may be used to implement the parasitic elements 630 instead of the parasitic element design 630 shown in FIGS. 13A-13C. As shown in FIG. 14A, each meandered dipole 700 may have a reduced physical length in the longitudinal direction of the base station antenna while having the same electrical length as the parasitic elements 630. The reduced electrical length is achieved by forming the parasitic element 700 so that is extends in serpentine fashion. Since the physical length of each parasitic element 700 may be shortened considerably, room for two parasitic elements 700 may be provided on each side of each shared low-band radiating element.

Figure 14B:
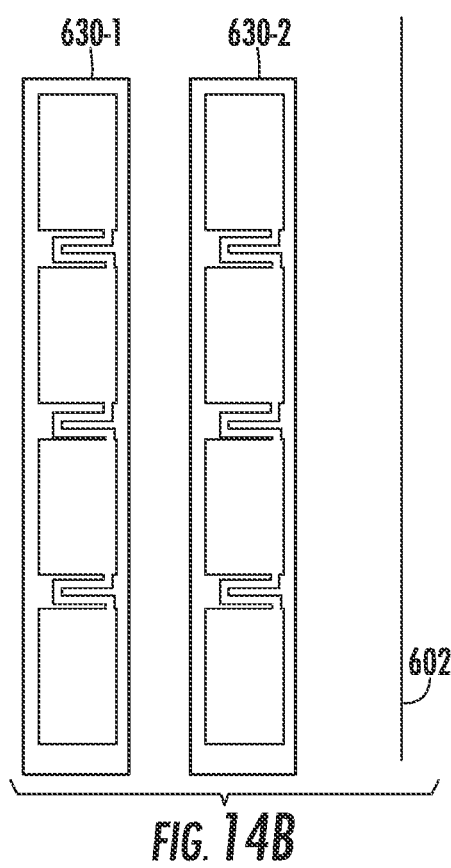
FIG. 14B is a schematic diagram illustrating how stacked dipoles may be used to implement the parasitic elements shown in FIG. 13C.

FIG. 14B is a schematic diagram illustrating another parasitic element arrangement that may be used in base station antennas according to embodiments of the present invention. In the embodiment of FIG. 14B, stacked vertical dipoles may be used to implement the parasitic elements 630 shown in FIG. 13C. As shown in FIG. 14B, the parasitic elements 630-1, 630-2 may be stacked forwardly of the reflector 602 of antenna 600. Only the parasitic elements 630 and the reflector 602 are shown in FIG. 14B to simplify the drawing.

Figure 14C:
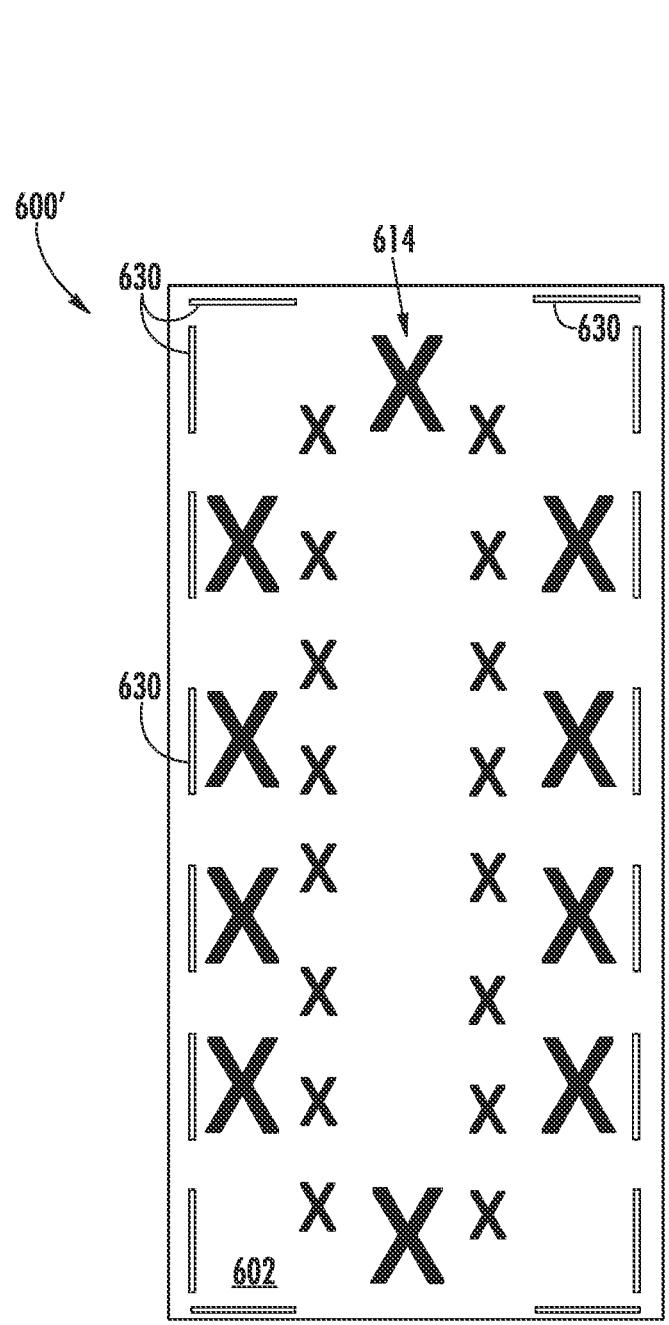
FIG. 14C is a schematic diagram illustrating how a combination of vertical dipoles and horizontal dipoles may be used to implement the parasitic elements shown in FIG. 13C.

FIG. 14C is a schematic diagram illustrating how both vertically and horizontally extending parasitic elements 630 may be used to provide four parasitic elements 630 per shared radiating element 614 in a base station antenna 600' that is modified version of the base station antenna 600 of FIG. 13A. As shown in FIG. 14C, the base station antenna 600' differs from the base station antenna 600 in that four additional parasitic elements 630 are added to base station antenna 600'. Each of the added parasitic elements 630 is oriented to extend horizontally in front of the reflector 602 as opposed to extending vertically in front of the reflector 602 as is the case with the remaining parasitic elements 630. Each power coupler 650 (not shown, but see, for example, FIG. 13C) may be connected to one of the vertically-disposed parasitic elements 630 that is adjacent the shared radiating element 614 that the power coupler 650 is associated with as well as one of the horizontally-disposed parasitic elements 630. The two parasitic elements may therefore together radiate at either a slant −45° polarization or a slant +45° polarization and hence better contribute to the antenna beams formed by the low-band arrays 610.

Figure 15A:
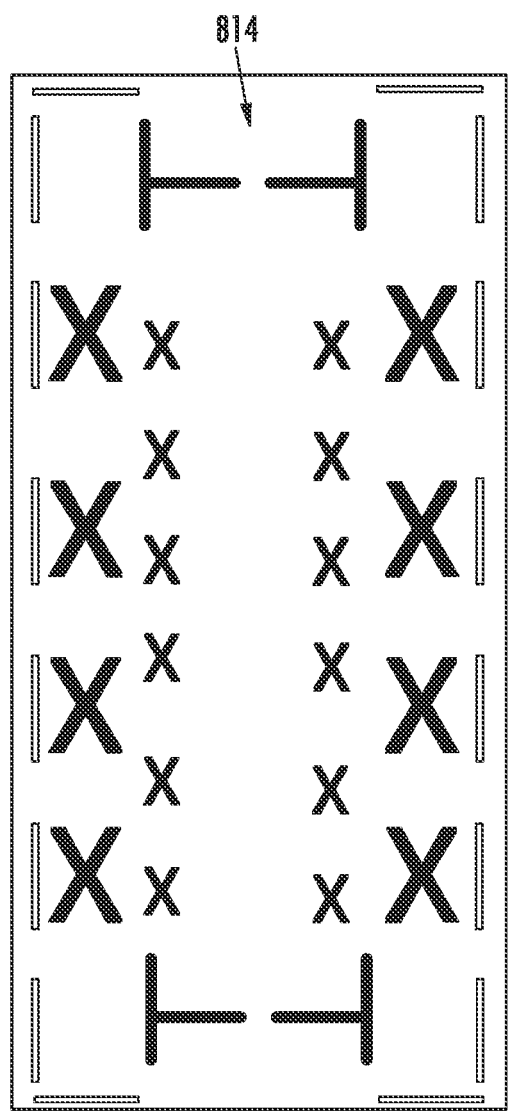
FIGS. 15A and 15B are schematic front views of two base station antennas according to embodiments of the present invention that use tri-pole radiating elements as shared radiating elements.
Figure 15B:
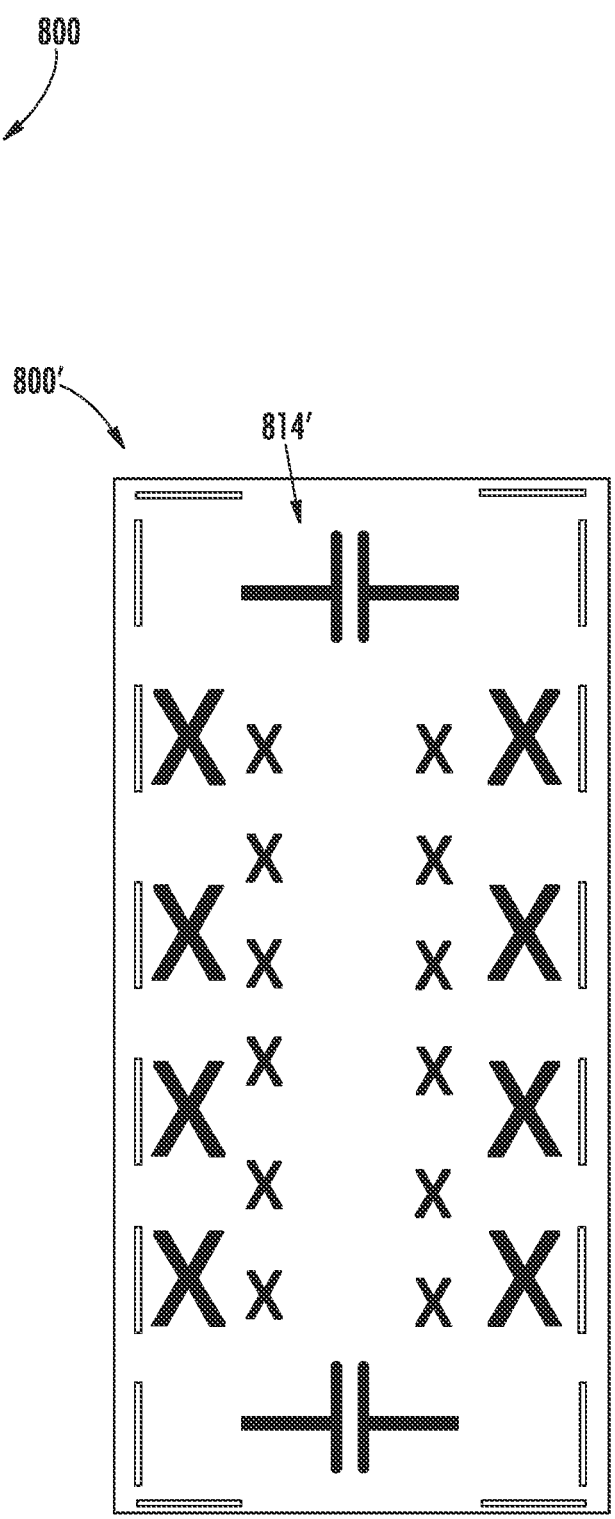

It will be appreciated that the shared radiating elements included in the base station antennas according to embodiments of the present invention may be implemented using any appropriate radiating element. For example FIGS. 15A and 15B are schematic front views of two base station antennas that have shared radiating elements 814, 814' that are implemented using tri-pole radiating elements. In the embodiment of FIG. 15A, the tri-pole radiating elements have a first arrangement, while in the embodiment of FIG. 15B the tri-pole radiating elements have a second arrangement. It will be appreciated that other radiating elements such as, for example, patch radiating elements may be used to implement the shared radiating elements included in the antennas according to embodiments of the present invention.

Figure 18A:
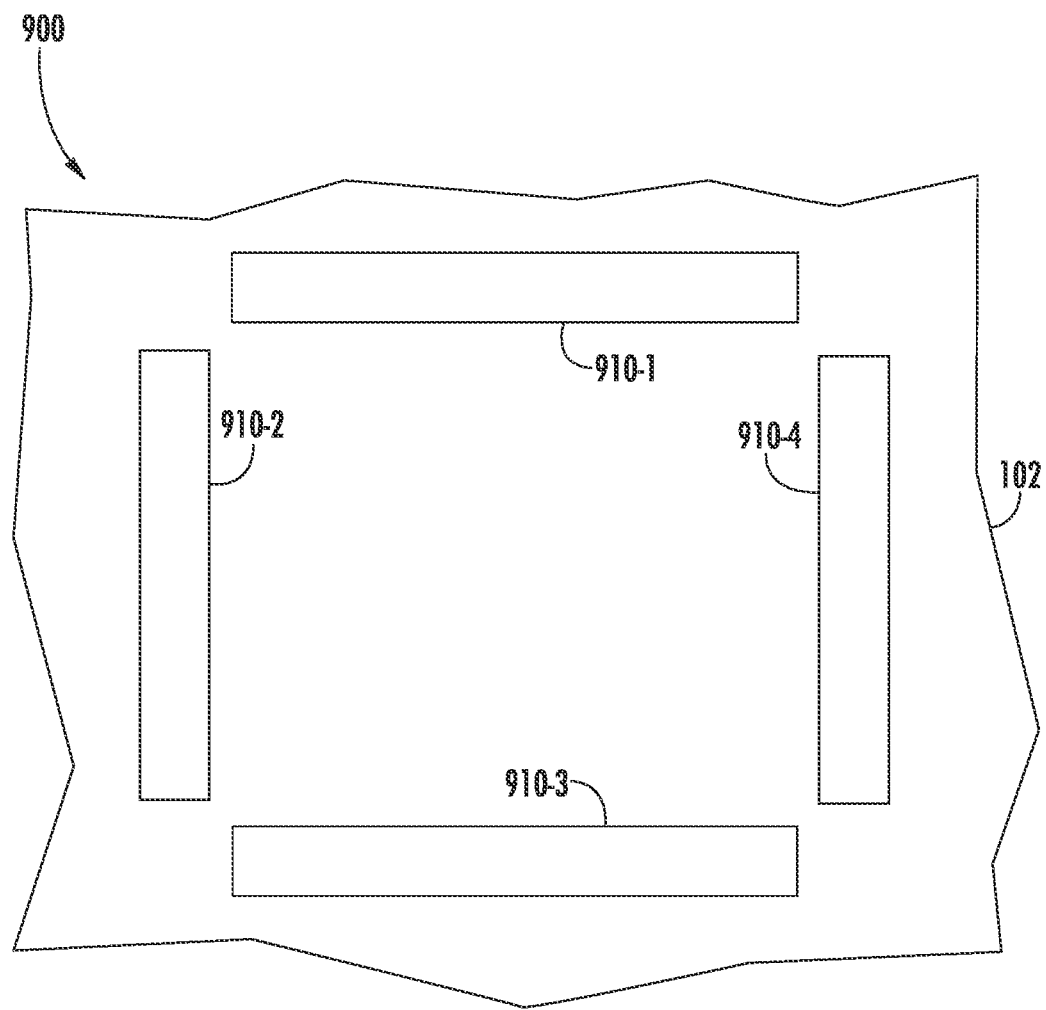
FIG. 18A is a schematic diagram illustrating how the shared box dipole radiating elements according to embodiments of the present invention may be implemented using dipoles having different lengths.
Figure 18B:
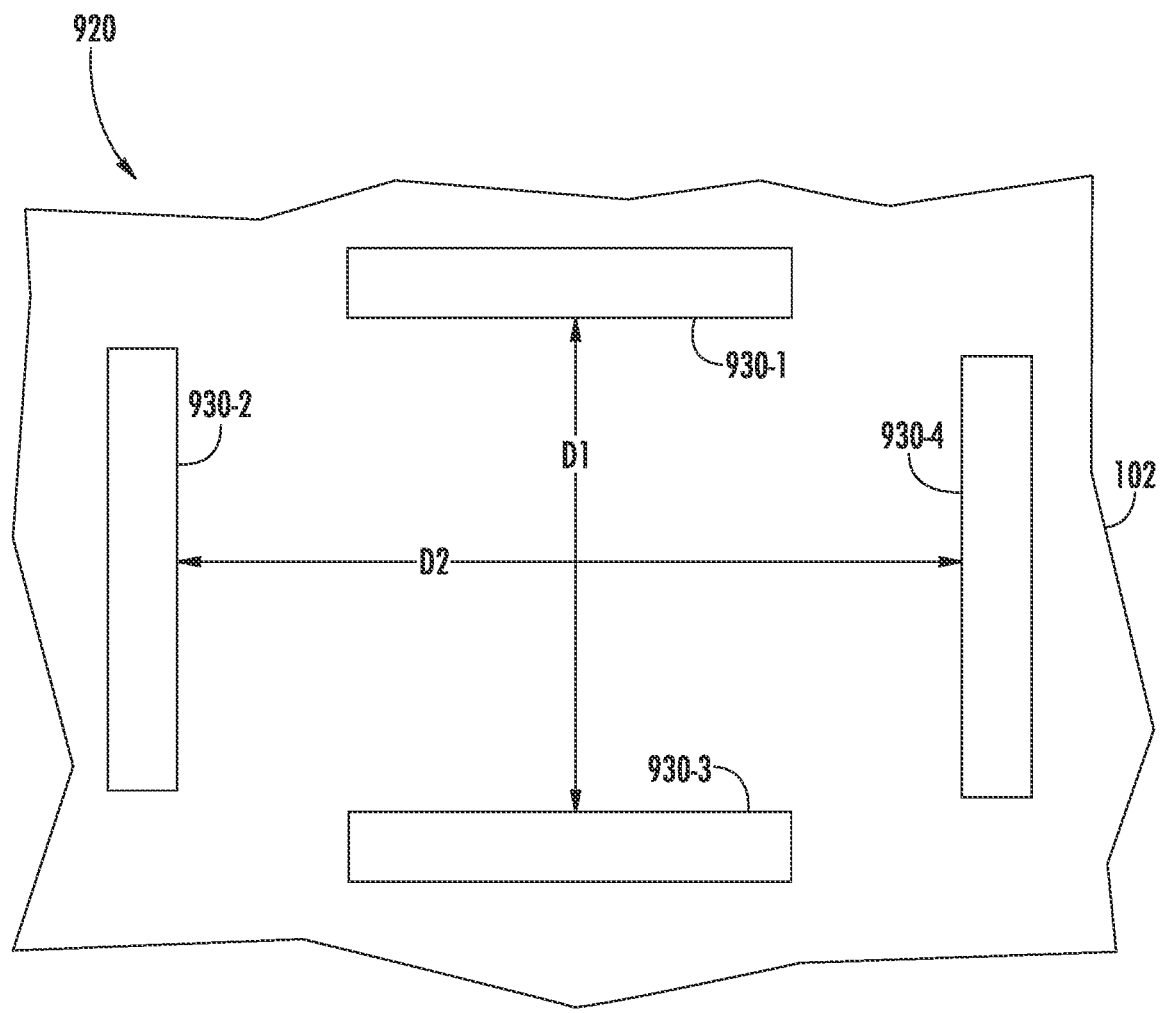
FIG. 18B is a schematic diagram illustrating how the shared box dipole radiating elements according to embodiments of the present invention may be implemented using dipoles that are spaced apart from each other by different amounts.
Figure 18C:
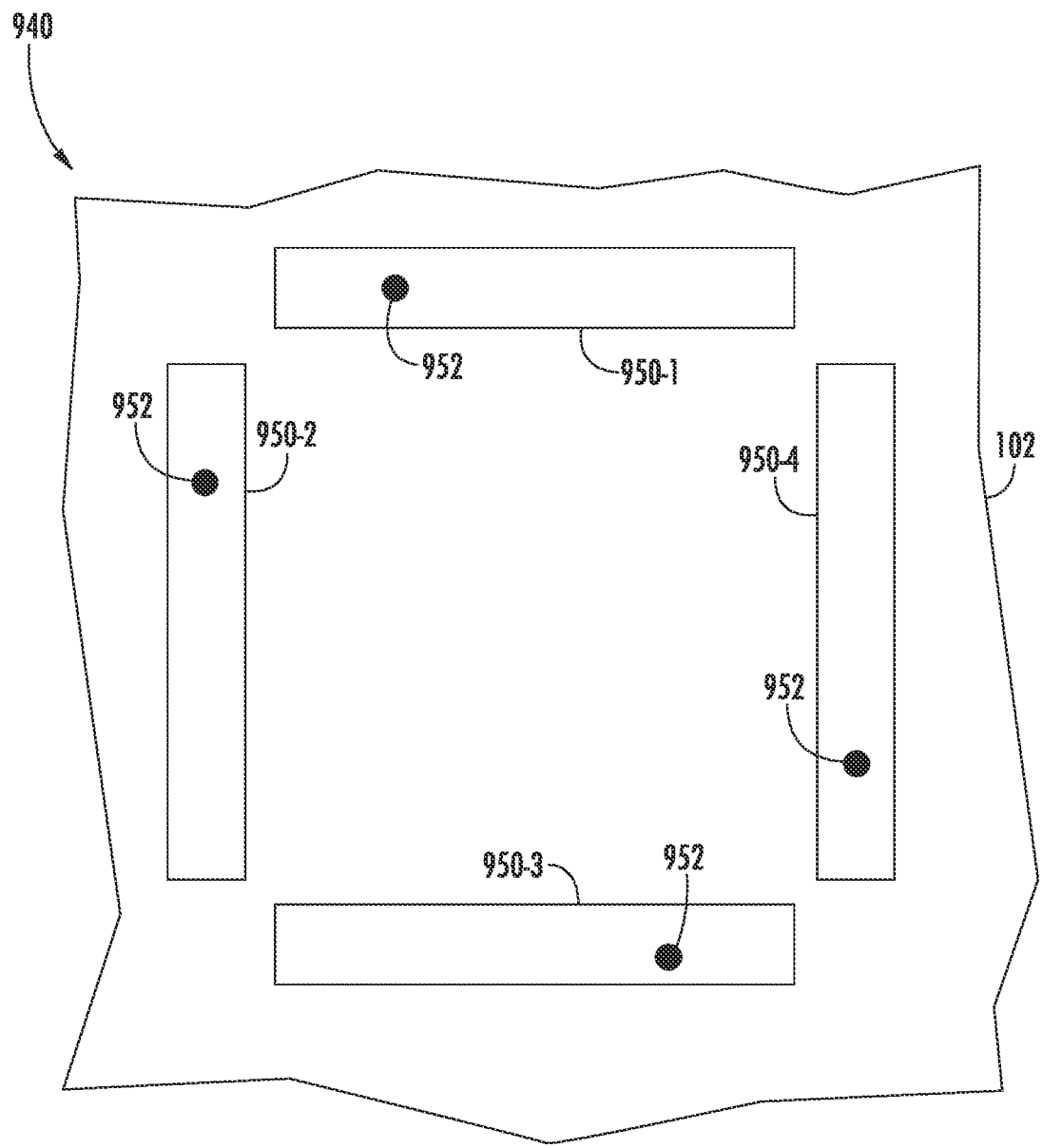
FIG. 18C is a schematic diagram illustrating how the shared box dipole radiating elements according to embodiments of the present invention may have offset feed points.

It will also be appreciated that many changes may be made to the shared box dipole radiating elements that are included in the base station antennas according to embodiments of the present invention from what is shown in the example embodiments depicted herein. FIGS. 18A-18C illustrate three examples of such changes. In particular, FIG. 18A is a schematic diagram of a shared box dipole radiating element 900 according to embodiments of the present invention that includes four dipole radiators 910-1 through 910-4. As shown in FIG. 18A, dipole radiators 910-1 and 910-3 are each longer than dipole radiators 910-2 and 910-4. Consequently, the "box" defined by the four dipole radiators has a non-square rectangular shape. In other embodiments, dipole radiators 910-2 and 910-4 may each be longer than dipole radiators 910-1 and 910-3. In still other embodiments, each dipole radiator 910-1 through 910-4 may have a different length. Providing shared box dipole radiators having dipole radiators with varied lengths may be advantageous, for example, because it provides a technique for adjusting the distance between the phase center for dipole radiators 930-1 and 930-2 with respect to the phase center for dipole radiators 930-3 and 930-4. Increasing the distance between these phase centers may increase the isolation between the two pairs of dipole radiators.

As another example, FIG. 18B is a schematic diagram illustrating how the shared box dipole radiating elements according to embodiments of the present invention may be implemented using dipoles that are spaced apart from each other by different amounts. In particular, FIG. 18B schematically depicts a shared box dipole radiating element 920 having "horizontal" dipole radiators 930-1 and 930-3 that are spaced apart from each other by a first distance D1 and "vertical" dipole radiators 930-2 and 930-4 that are spaced apart from each other by a second distance D2 that is different from the first distance D1. The distances D1 and D2 may be used to change the location of the phase center for the combination of dipole radiators 930-1 and 930-2 with respect to the phase center for the combination of dipole radiators 930-3 and 930-4. For example, increasing the distance D2 results in increased separation between the two aforementioned phase centers, which provides increased isolation between dipole radiators 930-1 and 930-2 with respect to dipole radiators 930-3 and 930-4.

As yet another example, FIG. 18C is a schematic diagram illustrating how the shared box dipole radiating elements according to embodiments of the present invention may have offset feed points. In particular, FIG. 18C schematically depicts a shared box dipole radiating element 940 in which the feed stalk for each dipole radiator 950-1 through 950-4 connects to the respective dipole radiator 950 at a "feed point" location 952 that is offset from the center of the respective dipole radiators 950. Moving the feed points 952 for one or more of the dipole radiators 950 acts to shift the phase centers for each pair of dipole radiators 950, and hence provides another technique for adjusting the amount of isolation between pairs of dipole radiators 950.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments. Thus, for example, while particular power couplers, shared radiating elements and the like may be described alone or in conjunction with one specific embodiment, it will be appreciated that the power couplers and shared radiating elements may be used in any of the disclosed embodiments of the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A base station antenna, comprising:
   a first array that is configured to transmit first polarization RF signals that are passed to the first array via a first feed network and to transmit second polarization RF signals that are passed to the first array via a second feed network;
   a second array that is configured to transmit first polarization RF signals that are passed to the second array via a third feed network and to transmit second polarization RF signals that are passed to the second array via a fourth feed network;
   a shared radiating element that is coupled to the first through fourth feed networks so that the shared radiating element is part of the first array and is part of the second array; and
   a first power coupler having first and second inputs that are coupled to two of the first through fourth feed networks, and an output that is coupled to a first radiator of the shared radiating element, the first power coupler including a first isolation path that is coupled to a first auxiliary radiating element.

2. The base station antenna of claim 1, wherein the first power coupler includes a second isolation path that is coupled to a second auxiliary radiating element.

3. The base station antenna of claim 2, further comprising a second power coupler having first and second inputs that are coupled to two of the first through fourth feed networks, and an output that is coupled to a second radiator of the shared radiating element.

4. The base station antenna of claim 3, wherein the second power coupler includes a first isolation path that is coupled to a third auxiliary radiating element and a second isolation path that is coupled to a fourth auxiliary radiating element.

5. The base station antenna of claim 1, wherein the first radiator and the first auxiliary radiating element are configured to transmit radio frequency ("RF") energy at different polarizations.

6. The base station antenna of claim 2, wherein the first auxiliary radiating element and the second auxiliary radiating element are configured to transmit radio frequency ("RF") energy at different polarizations.

7. The base station antenna of claim 1, wherein the first power coupler comprises a rat race coupler.

8. The base station antenna of claim 1, wherein the first power coupler comprises a 180° hybrid coupler that includes first through fourth quarter wavelength transmission line segments that are serially arranged to form a square and a fifth quarter wavelength transmission line segment that is coupled to an intersection of the first and second quarter wavelength transmission line segments.

9. The base station antenna of claim 1, wherein the first power coupler comprises first and second input ports and first and second output ports, where the first input port is coupled to the second input port by a first quarter wavelength transmission line segment and is coupled to the first output port by a second quarter wavelength transmission line segment, and wherein the first output port is coupled to the second output port by a third quarter wavelength transmission line segment and is coupled to the second input port by a half wavelength transmission line segment.

10. The base station antenna of claim 1, wherein the shared radiating element comprises a box dipole radiating element having first through fourth dipole radiators that are arranged to define a rectangle.

11. The base station antenna of claim 10, wherein a length of the first dipole radiator is different than a length of the second dipole radiator.

12. The base station antenna of claim 10, wherein the first dipole radiator is opposite the third dipole radiator and the second dipole radiator is opposite the fourth dipole radiator, and wherein a first distance between the first dipole radiator and the third dipole radiator is different than a second distance between the second dipole radiator and the fourth dipole radiator.

13. The base station antenna of claim 1, wherein the first auxiliary radiating element is a cloaked dipole radiator.

14. The base station antenna of claim 1, wherein the first auxiliary radiating element is a folded dipole radiator.

15. The base station antenna of claim 1, wherein a first vertical axis extends through the center of a first radiating element of the first array, a second vertical axis extends through the center of a first radiating element of the second array and a third vertical axis extends through the center of the shared radiating element when the base station antenna is mounted for use, wherein the third vertical axis is between the first vertical axis and the second vertical axis.

16. The base station antenna of claim 1, wherein the shared radiating element is positioned either above or below the radiating elements of the first array and the radiating elements of the second array when the base station antenna is mounted for use.

17. A power coupler, comprising:
    a first input port;
    a second input port;
    an output port;
    a first coupling transmission line that couples the first input port to the output port;
    a second coupling transmission line that couples the second input port to the output port;
    a first isolation path that is coupled between the first coupling transmission line and a first radiating element; and
    a second isolation path that is coupled between the second coupling transmission line and a second radiating element.

18. The power coupler of claim 17, wherein the first radiating element comprises a dipole radiator that is configured to emit radio frequency ("RF") energy having a vertical polarization.

19. The power coupler of claim 17, wherein the output port is coupled to a third radiating element, wherein the first and third radiating elements are configured to emit radio frequency ("RF") energy having different polarizations.

* * * * *